(12) United States Patent
Tehrani et al.

(10) Patent No.: US 10,911,150 B2
(45) Date of Patent: Feb. 2, 2021

(54) CLOCK RECOVERY FOR SUBCARRIER BASED COHERENT OPTICAL SYSTEMS

(71) Applicant: Infinera Corporation, Sunnyvale, CA (US)

(72) Inventors: Mohsen Nader Tehrani, Kanata (CA); Han Henry Sun, Ottawa (CA); David Krause, Nepean (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 16/452,484

(22) Filed: Jun. 25, 2019

(65) Prior Publication Data

US 2019/0393964 A1 Dec. 26, 2019

Related U.S. Application Data

(60) Provisional application No. 62/689,558, filed on Jun. 25, 2018.

(51) Int. Cl.
*H04B 10/60* (2013.01)
*H04B 10/556* (2013.01)
*H04B 10/2513* (2013.01)

(52) U.S. Cl.
CPC ..... *H04B 10/5561* (2013.01); *H04B 10/2513* (2013.01); *H04B 10/60* (2013.01)

(58) Field of Classification Search
CPC . H04B 10/5561; H04B 10/60; H04B 10/2513
See application file for complete search history.

(56) References Cited

U.S. PATENT DOCUMENTS

| | | | | |
|---|---|---|---|---|
| 2003/0183842 A1* | 10/2003 | Kizer | ........................ | G06F 1/10 257/158 |
| 2004/0207763 A1* | 10/2004 | Ciardi | .................... | H04N 5/126 348/723 |
| 2009/0147904 A1* | 6/2009 | Do | ........................ | H03L 7/0891 375/376 |
| 2016/0233931 A1* | 8/2016 | van Zelst | ................ | H04B 17/12 |
| 2019/0253152 A1* | 8/2019 | Houtsma | .............. | H04B 10/541 |

\* cited by examiner

*Primary Examiner* — Dzung D Tran
(74) *Attorney, Agent, or Firm* — Fish & Richardson P.C.; David L. Soltz

(57) ABSTRACT

Methods, systems, and apparatus, including computer programs encoded on computer storage media, for clock recovery in subcarrier based coherent optical systems. In one aspect, an apparatus includes a plurality of phase detectors configured to generate a plurality of phase detection outputs by detecting a plurality of digital signals associated with a plurality of frequency bands, each of the plurality of phase detection outputs being associated with a respective one of the plurality of frequency bands, alignment circuitry coupled to the plurality of phase detectors and configured to align phases of the plurality of phase detection outputs to be substantially same, and averaging circuitry coupled to the alignment circuitry and configured to generate a particular output based on the plurality of phase detection outputs with the aligned phases. The plurality of digital signals is adjusted based on the particular output.

25 Claims, 13 Drawing Sheets

CLOCK RECOVERY FOR SUBCARRIER BASED COHERENT OPTICAL SYSTEMS

CROSS REFERENCE TO RELATED APPLICATIONS

This application claims the benefit of U.S. Provisional Patent Application No. 62/689,558, filed Jun. 25, 2018, which is incorporated herein by reference in its entirety.

BACKGROUND

This specification relates generally to clock recovery in coherent optical systems.

Clock recovery is a critical function in coherent transmission systems. Recovering a transmitted clock from a received signal is a first step in recovering transmitted data. However, there can be many variables that impact timing synchronization to thereby affect the clock recovery, including jitter and chromatic dispersion (CD).

SUMMARY

One aspect of the present disclosure features an apparatus including a plurality of phase detectors configured to generate a plurality of phase detection outputs by detecting a plurality of digital signals associated with a plurality of frequency bands, each of the plurality of phase detection outputs being associated with a respective one of the plurality of frequency bands, alignment circuitry coupled to the plurality of phase detectors and configured to align phases of the plurality of phase detection outputs to be substantially same, and averaging circuitry coupled to the alignment circuitry and configured to generate a particular output based on the plurality of phase detection outputs with the aligned phases. The plurality of digital signals is adjusted based on the particular output.

In some embodiments, the alignment circuitry includes: a plurality of gain alignment circuits coupled to the plurality of phase detectors, each of the gain alignment circuits being configured to align a gain of a respective one of the plurality of phase detection outputs and a plurality of phase alignment circuits coupled to the plurality of gain alignment circuits, each of the plurality of phase alignment circuits being configured to align a phase of a respective one of the plurality of phase detection outputs that has an aligned gain.

The aligned gains of the plurality of phase detection outputs can be substantially same. Each of the gain alignment circuits can be configured to normalize the gain of the respective one of the plurality of phase detection outputs.

Each of the plurality of phase alignment circuits can be configured to: determine a phase difference between the respective one having the aligned gain and a reference and compensate the phase of the respective one based on the determined phase difference. The reference can be a particular phase detection output having a particular aligned gain of the plurality of phase detection outputs having aligned gains. A number of the plurality of phase alignment circuits can be smaller than a number of the plurality of gain alignment circuits by 1.

In some cases, the phase difference between the respective one and the particular phase detection output is associated with a residual chromatic dispersion (CD) between digital signals corresponding to the respective one and the particular phase detection output. The apparatus can further include chromatic dispersion equalizer (CDED) circuitry coupled to the plurality of phase detectors and configured to generate the plurality of digital signals with CD compensations, where the CDED circuitry is configured to adjust the CD compensations for the plurality of digital signals based on estimated values of the residual CDs that are obtained based on the phase differences.

In some embodiments, the averaging circuitry includes a plurality of multipliers configured to multiply the plurality of phase detection outputs by respective weights. The averaging circuitry can be configured to: select particular phase detection outputs of the plurality of phase detection outputs by multiplying the particular phase detection outputs by a particular weight larger than 0, unselect the other of the plurality of phase detection outputs by multiplying the other of the plurality of phase detection outputs by 0, and average the selected particular phase detection outputs to generate the particular output.

The apparatus can further include a loop filter coupled to the averaging circuitry and configured to filter samples of the particular output. The apparatus can further include a digital interpolator coupled to the averaging circuitry and configured to process a multiplexed signal with at least one phase value derived from the particular output, where the multiplexed signal is associated with the plurality of frequency bands and the plurality of digital signals is generated based on the multiplexed signal. The apparatus can further include a demultiplier configured to demultiplex the multiplexed signal into a plurality of demultiplexed signals in frequency domain, each of the plurality of demultiplexed signals corresponding to a respective one of the plurality of frequency bands, where the plurality of digital signals is based on the plurality of demultiplexed signals.

Each of the plurality of digital signals can correspond to a respective optical subcarrier associated with the respective frequency band. In some cases, each of the respective optical subcarriers does not spectrally overlap with each other. At least one of the plurality of optical subcarriers can be modulated in accordance with a modulation format, the modulation format being one of an m-quadrature amplitude modulation (m-QAM) modulation, where m is a positive integer, a quadrature phase shift keying (QPSK) modulation format, and a binary phase shift keying (BPSK) modulation format.

Another aspect of the present disclosure features a receiver including: a frontend configured to receive an optical signal and convert the optical signal into digital samples corresponding to symbols carried by a plurality of optical subcarriers, each of the plurality of optical subcarriers having a respective frequency band and a processing device coupled to the frontend. The processing device is configured to: demultiplex digital representations of the digital samples into a plurality of digital signals, each of the plurality of digital signals being associated with a respective optical subcarrier of the plurality of optical subcarriers; detect phases of the plurality of digital signals to generate a plurality of phase detection outputs, each of the plurality of phase detection outputs being associated with a respective optical subcarrier of the plurality of optical subcarriers; align the phases of the plurality of phase detection outputs; generate a particular output based on the plurality of phase detection outputs with the aligned phases; and adjust the plurality of digital signals based on the particular output. The processing device can include a digital signal processor (DSP).

The processing device can be configured to: align gains of the plurality of phase detection outputs such that the aligned gains of the plurality of phase detection outputs are substantially same and align the phases of the plurality of phase detection outputs having the aligned gains such that the aligned phases of the plurality of phase detection outputs are substantially same.

The processing device can be configured to determine a respective phase difference between each of the plurality of phase detection outputs and a particular phase detection output of the plurality of phase detection outputs; and compensate the phases of the plurality of phase detection outputs with the determined respective phase differences.

The processing device can be configured to: estimate residual chromatic dispersion values for the plurality of digital signals based on the determined respective phase differences and adjust chromatic dispersion compensations of the plurality of digital signal based on the estimated residual chromatic dispersion values.

The processing device can be configured to select particular phase detection outputs from the plurality of phase detection outputs having the aligned phases and average the selected particular phase detection outputs to generate the particular output.

The processing device can be configured to adjust interpolation of digital representations of the digital samples based on at least one phase value derived from the particular output. The processing device can be configured to filter samples of the particular output and derive the at least one phase value based on the filtered samples.

A further aspect of the present disclosure features a method including: detecting a plurality of digital signals associated with a plurality of frequency bands to generate a plurality of phase detection outputs, each of the plurality of phase detection outputs being associated with a respective one of the plurality of frequency bands; aligning phases of the plurality of phase detection outputs to be substantially same; and generating a particular output based on the plurality of phase detection outputs having the aligned phases, where the plurality of digital signals is adjusted based on the particular output.

Implementations of the above techniques include methods, apparatus, systems and computer program products. One such computer program product is suitably embodied in a non-transitory machine-readable medium that stores instructions executable by one or more processors. The instructions are configured to cause the one or more processors to perform the above-described actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
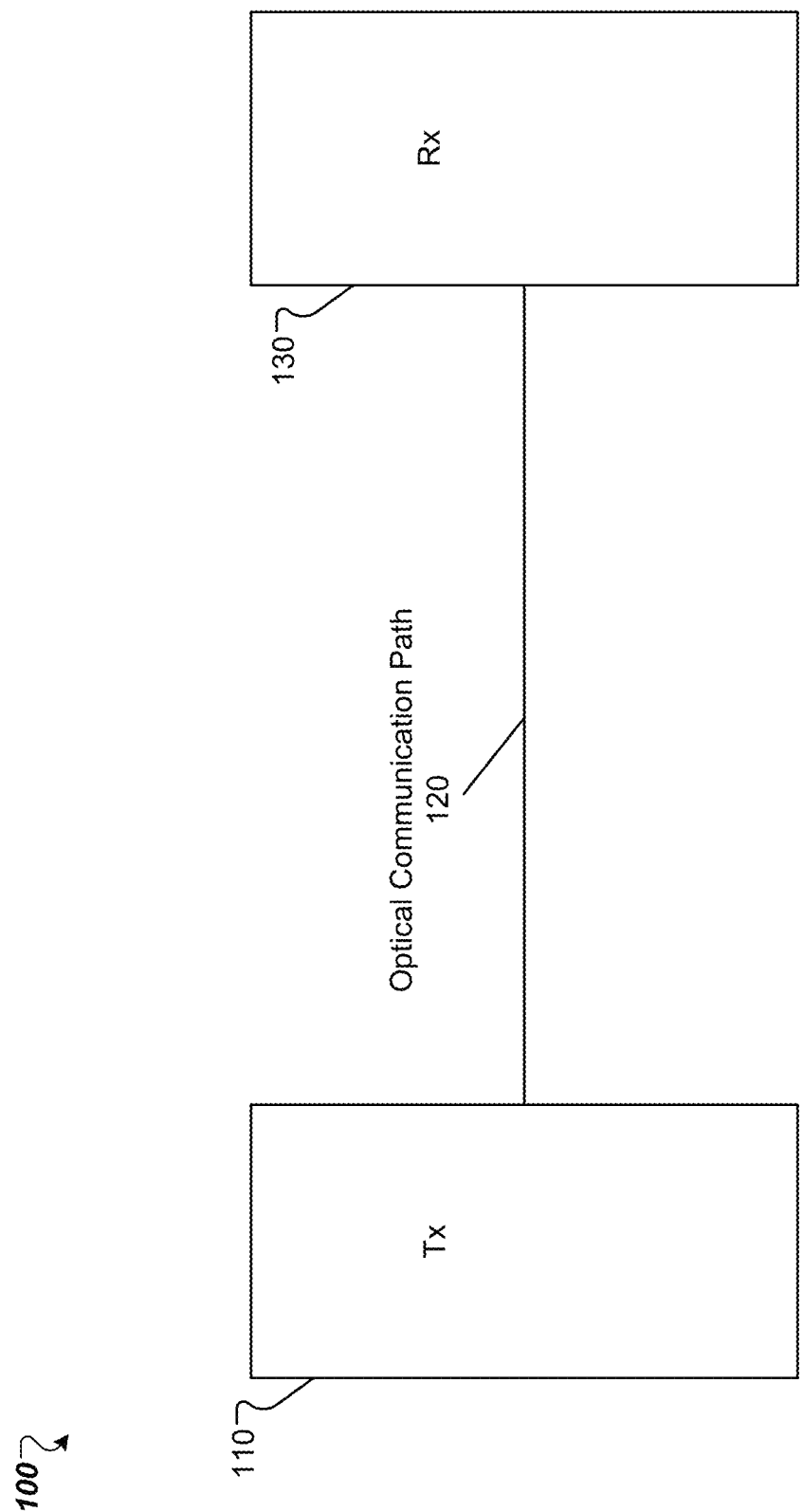
FIG. 1 is a schematic diagram illustrating an example of a coherent optical communication system.

In a coherent optical system in which optical subcarriers are transmitted from a transmit node to a receive node, timing synchronization between the optical subcarriers can be impacted by a number of variables. The variables include the modulation format of the subcarriers, the type of distortion that the subcarriers experience as the subcarriers propagate along an optical communication path including segments of optical fiber, the amount of noise that is present during propagation, the environment in which the subcarriers are implemented, and the spectral occupancy of the subcarriers.

Jitter is another variable that is preferably corrected for in carrying accurate timing synchronization. Jitter is a deviation from actual periodicity of a presumably periodic signal, for example, in relation to a reference clock signal. One of the sources of jitter in the receiver is the phase detector jitter of the clock recovery. Particularly, higher order modulations, e.g., 64 QAM (quadrature amplitude modulation), used in coherent optical systems are more sensitive to jitter. In a coherent optical receiver, depending on the modulation format and baud-rate, residual chromatic dispersion (CD) can severely degrade performance of phase detectors such as a sensitivity of the phase detectors to phase error.

Implementations of the present disclosure provide techniques of clock recovery for subcarrier based devices, such as coherent receivers, by aligning outputs of phase detectors for a plurality of subcarriers before subcarrier averaging, which enables significant jitter reduction as well as higher clock recovery loop bandwidth. The techniques utilize full capability of subcarrier averaging for clock recovery without degrading sensitivity of phase detectors.

In some implementations, the output of each of the phase detectors is aligned to the output of one of phase detectors, such that the outputs of the phase detectors have substantially same gain and phase. As a result, the aligned phase detection outputs associated with all or multiple subcarriers are averaged to obtain an averaged phase detection output. As the phases of the outputs are aligned and averaged, the phase differences (and time delays) among the subcarriers can be greatly reduced. Accordingly, a bandwidth of a loop filter (e.g., a range of frequencies over which the loop filter operates) used for filtering the averaged phase detection output can be significantly increased. The jitter can be also significantly reduced, and the optical system can be more tolerant to jitter at higher order modulation formats.

In the coherent optical system, the modulated optical signal is transmitted to a receiver through a transmission channel, which may include one or more segments of optical fiber, optical amplifiers, and optical switches. The channel may cause chromatic dispersion (CD) in an optical signal including optical subcarriers. The receiver can include chromatic dispersion equalizer (CDEQ) to compensate the effects of CD in the digital subcarriers, e.g., electrical signals associated with the optical subcarriers, based on estimated values of CD. However, due to errors in CD estimation, the digital subcarriers may still include erroneous information because the CD may not be entirely corrected or compensated for by the CDEQ ("residual CD"). The alignment of the phase detection outputs can obtain phase differences among the subcarriers, which can be used to more accurately estimate residual CD in the subcarriers. The estimated residual CD can be used to update CD taps applied in the CDEQ to provide an improved CD estimation. A more accurate CD estimation can reduce waveform distortion, particularly in cases of high-order modulation formats optical channel with significant impairments that may induce distortions or errors in the transmitted optical subcarriers, and for down-stream DSP functions, such as time domain equalizers (TDEQs). For example, this can help TDEQ to lock in tougher channel conditions in which lower signal-to-noise is observed.

FIG. 1 is a schematic diagram illustrating an example of a coherent optical communication system 100 consistent with the present disclosure. The optical communication system 100 may include a transmitter Tx 110 that supplies one or more modulated optical signals to an optical communication path 120, which may include one or more segments of optical fiber as well as other optical components, such as optical switches and optical amplifiers. The modulated optical signal may propagate along optical communication path 120 to a receiver Rx 130.

Figure 2:
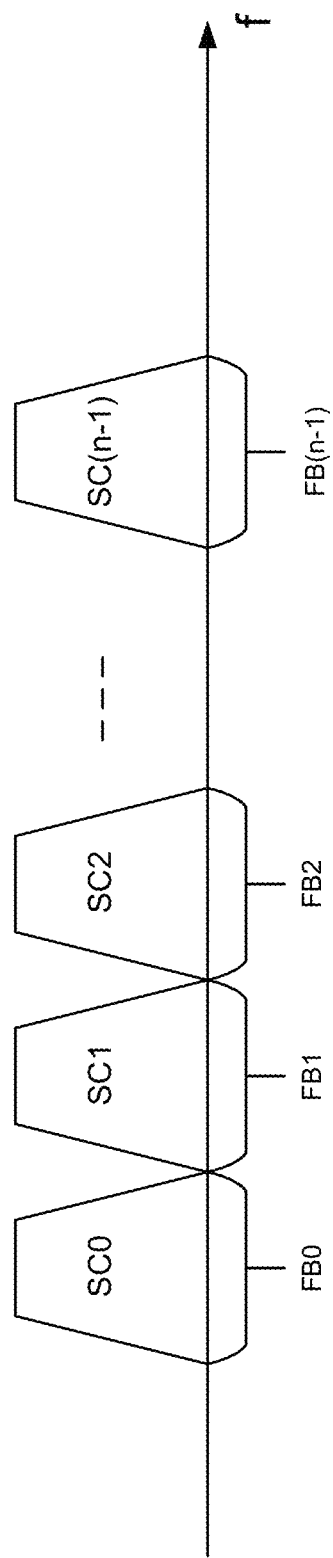
FIG. 2 is an example of a spectral plot showing optical subcarriers.

As shown in FIG. 2, the modulated optical signal may include a plurality of optical subcarriers SC0 to SC(n−1), where n is an integer. Each optical subcarrier SC0, SC1, SC2, . . . , SC(n−1) has a respective frequency band (FB) FB0, FB1, FB2, FB(n−1). The subcarriers may, in one example, be Nyquist subcarriers that do not substantially overlap spectrally with one another. In another example, the subcarriers may be orthogonal frequency division multiplexed (OFDM) subcarriers. At least one of the optical subcarriers can be modulated in accordance with a modulation format, e.g., an m-quadrature amplitude modulation (m-QAM) modulation (m being a positive integer), a quadrature phase shift keying (QPSK) modulation format, or a binary phase shift keying (BPSK) modulation format.

Figure 3:
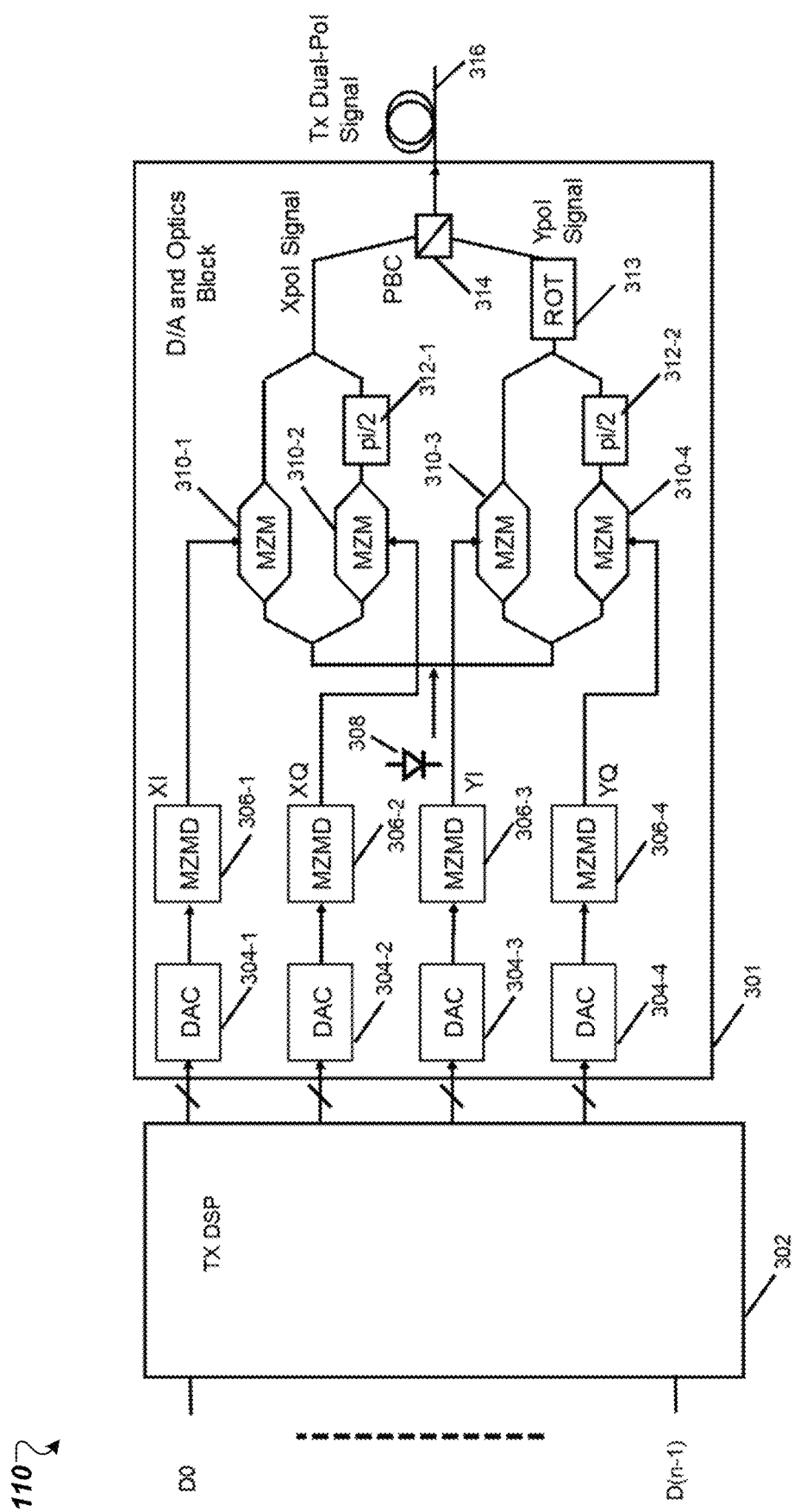
FIG. 3 is a schematic diagram illustrating an example of a transmitter of a subcarrier based coherent optical system.

FIG. 3 shows an example of a transmitter Tx consistent with an aspect of the present disclosure. The transmitter Tx 110 may include a Tx DSP 302, which may receive a plurality of input data streams D0 to D(n−1). Based on data inputs D0-D(n−1), DSP 302 may supply a plurality of outputs to D/A and optics block 301 including digital-to-analog conversion (DAC) circuits 304-1 to 304-4, which convert digital signals received from DSP 302 into corresponding analog signals. D/A and optics block 301 may also include driver circuits 306-1 to 306-2 that receive the analog signals from DACs 304-1 to 304-4 and adjust the voltages or other characteristics thereof to provide drive signals to a corresponding one of modulators 310-1 to 310-4.

D/A and optics block 301 further includes modulators 310-1 to 310-4, each of which may be a Mach-Zehnder modulator (MZM) that modulates phase and/or amplitude of light output from laser 308. As further shown in FIG. 3, the light output from laser 308, also included in block, 301, is split, such that a first portion of the light is supplied to a first MZM pairing including MZMs 310-1 and 310-2 and a second portion of the light is supplied to a second MZM pairing including MZMs 310-3 and 310-4. The first portion of the light is further split into third and fourth portions, such that the third portion is modulated by MZM 310-1 to provide an in-phase (I) component of an X (or TE) polarization component of a modulated optical signal, and the fourth portion is modulated by MZM 310-2 and fed to phase shifter 312-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 310-3 to provide an I component of a Y (or TM) polarization component of the modulated optical signal, and the sixth portion is modulated by MZM 310-4 and fed to phase shifter 312-2 to shift the phase of such light by 90 degrees to provide a Q component of the Y polarization component of the modulated optical signal.

The optical outputs of MZMs 310-1 and 310-2 are combined to provide an X polarized optical signal including I and Q components and fed to a polarization beam combiner (PBC) 314 provided in block 301. In addition, the outputs of MZMs 310-3 and 310-4 are combined to provide an optical signal that is fed to polarization rotator 313, further provided in block 301, that rotates the polarization of such optical signal to provide a modulated optical signal having a Y (or TM) polarization. The Y polarized modulated optical signal is also provided to PBC 314, which combines the X and Y polarized modulated optical signals to provide a polarization multiplexed ("dual-pol") modulated optical signal onto optical fiber 316, for example, which may be included as a segment of optical fiber in optical communication path 120. The polarization multiplexed optical signal output from D/A and optics block 301 includes subcarriers SC0-SC(n−1), for example, such that each subcarrier has X and Y polarization components that each have I and Q components.

Figure 4:
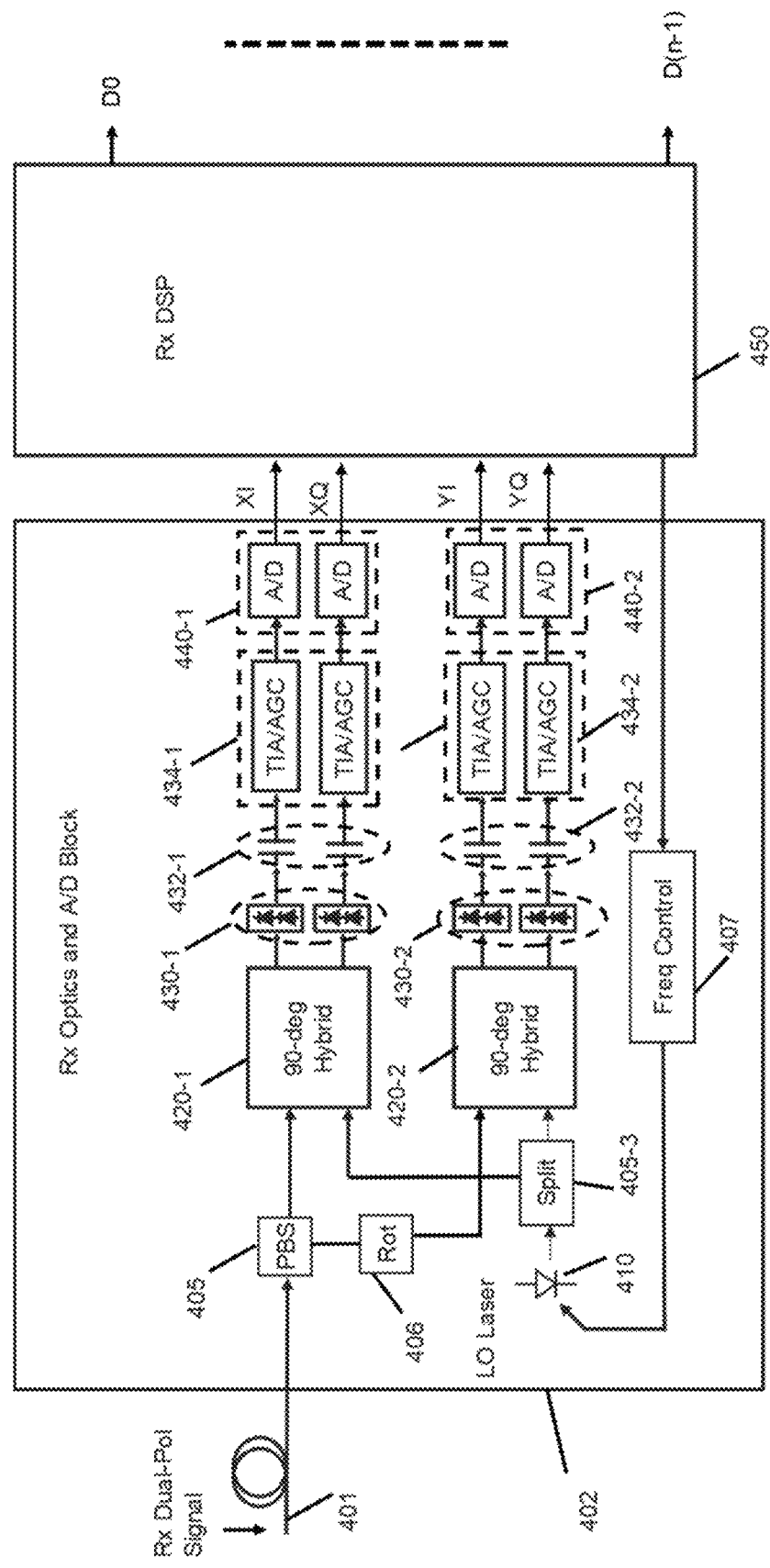
FIG. 4 is a schematic diagram illustrating an example of a receiver of a subcarrier based coherent optical system.

FIG. 4 shows an example of a receiver Rx consistent with an aspect of the present disclosure. The optical receiver Rx 130 may include an Rx optics and A/D block 402, which, in conjunction with DSP 450, may carry out coherent detection. Block 402 may include a polarization splitter 405 with first (405-1) and second (405-2) outputs), a local oscillator (LO) laser 410, 90 degree optical hybrids or mixers 420-1 and 420-2 (referred to generally as hybrid mixers 420 and individually as hybrid mixer 420), detectors 430-1 and 430-2 (referred to generally as detectors 430 and individually as detector 430, each including either a single photodiode or balanced photodiode), AC coupling capacitors 432-1 and 432-2, transimpedance amplifiers/automatic gain control circuits (TIA/AGC) 434-1 and 434-2, ADCs 440-1 and 440-2 (referred to generally as ADCs 440 and individually as ADC 440), and an RX DSP 450.

Polarization beam splitter (PBS) 405 may include a polarization splitter that receives an input polarization multiplexed optical signal including optical subcarriers SC0 to SC(n−1) supplied by optical fiber link 401, which may be, for example, an optical fiber segment as part of one of optical communication paths 120. PBS 405 may split the incoming optical signal into the two X and Y orthogonal polarization components. The Y component may be supplied to a polarization rotator 406 that rotates the polarization of the Y component to have the X polarization. Hybrid mixers 420 may combine the X and rotated Y polarization components with light from local oscillator laser 410. For example, hybrid mixer 420-1 may combine a first polarization signal (e.g., the component of the incoming optical signal having a first or X (TE) polarization output from PBS port 405-1) with light from local oscillator 410, and hybrid mixer 420-2 may combine the rotated polarization signal (e.g., the component of the incoming optical signal having a second or Y (TM) polarization output from PBS port 405-2) with the light from local oscillator 410. In one example, polarization rotator 490 may be provided at PBS output 405-2 to rotate Y component polarization to have the X polarization.

Detectors 430 may detect mixing products output from the optical hybrids, to form corresponding voltage signals, which are subject to AC coupling by capacitors 432-1 and 432-1, as well as amplification and gain control by TIA/AGCs 434-1 and 434-2. The outputs of TIA/AGCs 434-1 and 434-2 and ADCs 440 may convert the voltage signals to digital samples. For example, two detectors or photodiodes 430-1 may detect the X polarization signals to form the corresponding voltage signals, and a corresponding two ADCs 440-1 may convert the voltage signals to digital samples for the first polarization signals after amplification, gain control and AC coupling. Similarly, two detectors 430-2 may detect the rotated Y polarization signals to form the corresponding voltage signals, and a corresponding two ADCs 440-2 may convert the voltage signals to digital samples for the second polarization signals after amplification, gain control and AC coupling. RX DSP 450 may process the digital samples associated with the X and Y polarization components to output data D0 to D(n−1) associated with subcarriers SC0 to SC(n−1).

While FIG. 4 shows the optical receiver as including a particular quantity and arrangement of components, in some implementations, the optical receiver may include additional components, fewer components, different components, or differently arranged components. The quantity of detectors 430 and/or ADCs 440 may be selected to implement an optical receiver that is capable of receiving a polarization multiplexed signal. In some instances, one of the components illustrated in FIG. 4 may carry out a function described herein as being carry outed by another one of the components illustrated in FIG. 4.

Consistent with the present disclosure, to demodulate subcarriers SC0 to SC(n−1), local oscillator 410 may be tuned to output light having a wavelength or frequency relatively close to one or more of the subcarrier wavelengths or frequencies to thereby cause a beating between the local oscillator light and the subcarriers. The Rx DSP 450 may provide information about the subcarrier wavelengths or frequencies to the local oscillator 410 through a frequency control module 407. In one of the example, the local oscillator may be a semiconductor laser, which may be tuned thermally or through current adjustment. If thermally tuned, the temperature of the local oscillator laser 410 is controlled with a thin film heater, for example, provided adjacent the local oscillator laser. Alternatively, the current supplied to the laser may be controlled, if the local oscillator laser is current tuned. The local oscillator laser 410 may be a semiconductor laser, such as a distributed feedback laser or a distributed Bragg reflector laser.

Figure 5A:
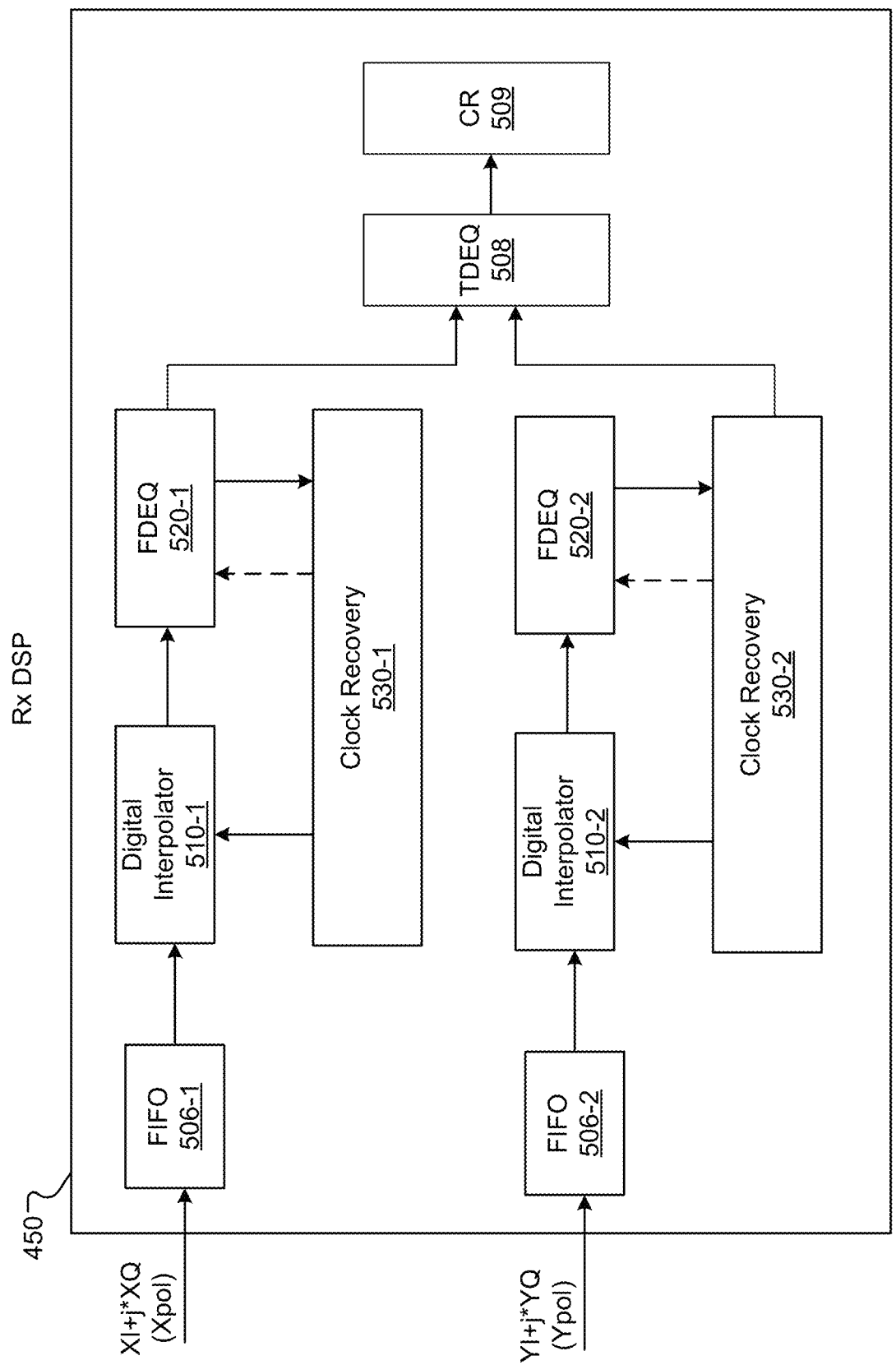
FIGS. 5A and 5B illustrate an example of a digital signal processor (DSP) with clock recovery for a coherent optical system.
Figure 5B:
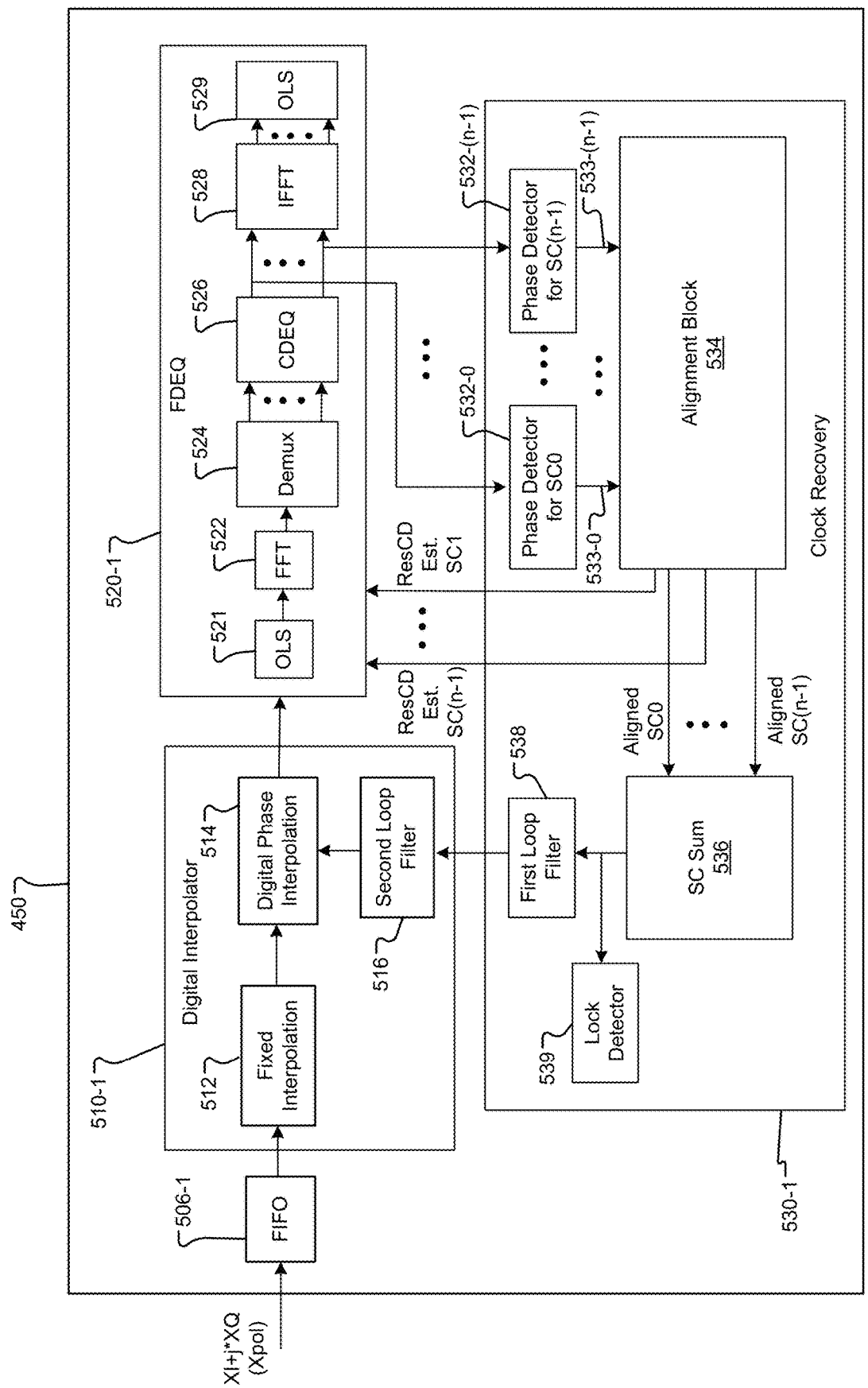

FIGS. 5A and 5B illustrate an example of a digital signal processor (DSP) with clock recovery for a coherent optical receiver Rx. The Rx DSP 450 receives digital samples from the ADCs 440. Particularly, the digital samples from two ADCs 440-1 correspond to symbols carried by X (or TE) polarization of the optical subcarriers and may be represented by the complex number XI+jXQ, and the digital samples from two ADCs 440-2 correspond to symbols carried by Y (or TM) polarization of the optical subcarriers and may be presented by the complex number YI+jYQ.

The Rx DSP 450 can include two path engines, one for X polarization component and the other for Y polarization component.

The digital samples represented by the complex number XI+jXQ may be first stored in FIFO (first in first out) 506-1, which may include a buffer, for example. The digital samples output from FIFO 506-1 may next be processed by digital interpolator circuit 510-1 to decrease the sampling rate, and then provided to frequency domain equalizer (FDEQ) 520-1. An example of an interpolator circuit is described in Published U.S. patent application Ser. No. 12/791,694, titled "Method, System, And Apparatus For Interpolating An Output Of An Analog-To-Digital Converter", filed Jun. 1, 2010, the entire contents of which are incorporated herein by reference.

FIG. 5B shows Rx DSP 450 in greater detail. As shown in FIG. 5B, the FDEQ 520-1 may include overlap and save (OLS) buffer 521, fast Fourier transform (FFT) module 522, de-multiplexer 524, chromatic dispersion equalizer (CDEQ) circuits 526, IFFT module 528, and OLS buffer 529.

The outputs of the FDEQ 520-1, e.g., outputs of the CDEQ circuits 526 as shown in FIG. 5B, can be supplied to a clock recovery unit 530-1 to determine a clock phase or clock timing associated with the received subcarriers. As described in further detail below, the clock recovery unit 530-1 may align phases of phase detection outputs associated with the received subcarriers and average the aligned phases to determine information associated with the clock phase or clock timing. Such phase or timing information or data may be supplied to a digital interpolator 510-1 to adjust or control the timing of the digital samples output from two ADCs 440-1. The clock recovery unit 530-1 may determine phase differences between the received subcarriers that can be used to estimate values of residual CDs in the received subcarriers, as the phase differences are proportional to the residual CDs. The estimated residual CDs can be fed back to the FDEQ 520-1, e.g., the CDEQ circuits 526, for CD compensation. The digital interpolator 510-1, the FDEQ 520-1, and the clock recovery unit 530-1 can form a clock recovery loop.

It is noted that digital samples output from two ADC 440-2 associated with Y polarization components of subcarrier may be processed in a similar manner to that of digital samples output from two ADC 440-2 and associated with the X polarization component of each subcarrier. Namely, FIFO 506-2, digital interpolator 510-2, FDEQ 520-2, and clock recovery unit 530-2 may have a similar structure and operate in a similar fashion as FIFO 506-1, digital interpolator 510-1, FDEQ 520-1, and clock recovery unit 530-1, respectively.

Similarly, the outputs of the FDEQ 520-2 can be supplied to clock recovery unit 530-2 to determine a clock phase or clock timing associated with the received subcarriers. The clock recovery unit 530-2 may align phases associated with the received subcarriers and average the aligned phases to determine the clock phase or clock timing information. Such phase or timing information or data may be supplied to digital interpolator 510-2 to adjust or control the timing of the digital samples output from two ADCs 440-2. The clock recovery unit 530-2 may determine phase differences between the received subcarriers that can be used to estimate values of residual CDs in the received subcarriers. The estimated residual CDs can be fed back to the FDEQ 520-2 to reduce the residual CD in the subcarriers. The digital interpolator 510-2, the FDEQ 520-2, and the clock recovery unit 530-2 can form a second clock recovery loop.

As further shown in FIG. 5A, the Rx DSP 450 may include time domain equalizer (TDEQ) 508 that can be configured to receive samples from FDEQ 520-1 associated with the X-polarization component and samples from FDEQ 520-2 associated with the Y-polarization component and perform time domain equalization on such samples. For example, the TDEQ 508 can be configured as a butterfly-structured K-point finite impulse response (FIR) unit that dynamically tracks state of polarization (SOP), demodulates the X-polarization component and the Y-polarization component, and compensates for polarization mode dispersion (PMD) and residual distortions from the preceding FDEQs 520-1 and 520-2. The TDEQ 108 may be further coupled to a carrier recovery (CR) unit 509. The CR unit 509 may be configured to track and compensate any mismatch in frequency and/or phase between an oscillator 308 at the transmitter 110 and a local oscillator 410 at the receiver 130. The CR unit 509 can adopt feedback carrier recovery (FBCR) and/or forward carrier recovery (FFCR).

Returning to FIG. 5B, which, as noted above, shows the X polarization path engine of DSP 450 in greater detail, DSP 450 includes FIFO module 506-1 can organize and manipulate the digital samples from the two ADCs 440-1. The FIFO module 506-1 can be implemented as a hardware shift register or using a different memory structure, e.g., a circular buffer.

As noted above, Rx DSP 450 includes digital interpolator 510-1. Interpolate 510-1 includes digital phase interpolation module 514 that is configured to adjust a sampling time of the digital samples from the two ADCs 440-1. The digital phase interpolation module 514 may employ an interpolation function with phase values adjustable in accordance with phase errors detected by clock recovery unit 530-1. The digital interpolator 510-1 may also include a fixed interpolation module 512 coupled between the FIFO module 506-1 and the digital phase interpolation module 514. The fixed interpolation module 512 can be configured to employ an interpolation function with fixed values to interpolate the digital samples before the digital phase interpolation module 514. The phase values input to the digital phase interpolation module 514 may be derived from outputs of phase detectors 532-0 to 532-($n$−1) (collectively referred to herein as "532").

Chromatic dispersion (CD) associated with the optical subcarriers may be compensated digitally in the frequency domain by providing the digital samples applying frequency domain equalizer (FDEQ) 520-1 to the digital samples. As shown in FIG. 5B, the FDEQ 520-1 includes an OLS buffer 521, an FFT module 522, a de-multiplexer 524, chromatic dispersion equalizer (CDEQ) circuits 526, IFFT modules 528, and OLS buffers 529.

The overlap and save buffer 521 can receive the interpolated digital samples from the digital interpolator 510. For example, the OLS buffer 521 can receive 128 samples per second and use the current 128 samples with the previous 128 samples to form a vector of 256 elements. The FFT module 522 can receive the vector elements from the OLS buffer 521 and convert the vector elements to the frequency domain using, for example, a fast Fourier transform (FFT) into frequency components, each of which can be stored in a register or "bin" or other memory, as a result of carry outing the FFT. For example, the FFT module 522 may convert the 256 vector elements to 256 frequency components. The de-multiplexer 524 can de-multiplex the frequency components to respective vectors associated with a plurality of digital subcarriers corresponding to the plurality of optical subcarriers SC0 to SC(n−1). Each of the respective vectors can include a group of frequency components and correspond to a respective subcarrier. Each of the respective vectors can be supplied to a respective one of CDEQ circuits 526. Each CDEQ circuit 526 can include a finite impulse response (FIR) filter that corrects, offsets or reduces the effects of, or errors associated with chromatic dispersion (CD) of the respective subcarrier.

The output of each CDEQ circuit 526 can be provided to an inverse fast Fourier transform (IFFT) module 528. Particularly, the IFFT module can convert each of the respective vectors back to the time domain into digital samples. Additionally, each OLS buffer 529 can receive respective digital samples from the IFFT module 528 and partially output the samples. For example, the overlap and save buffer 529 can take the first 64 components of a 128 element vector from the IFFT module 528 and output 64 samples as an output of the FDEQ 520-1.

The CDEQ circuits 526 can be coupled to n phase detectors 532-0, . . . , 532-($n$−1) (collectively referred to herein as "532"). The output of each of the CDEQ circuits 526 can be supplied to a respective clock phase detector 532 to determine a clock phase or clock timing associated with the subcarrier corresponding to the output of the CDEQ circuit 526. Each of the phase detectors 532 can estimate CD in the respective subcarrier.

The output of each of the phase detectors 532 is a complex number having a real part and an imaginary part. The real part of the complex number can be used for a lock detector 539, and the imaginary part can be used for delay compensation in the receiver (RX) signal by the digital phase interpolation module 514. The lock detector 539 can determine a status of the clock recovery loop, e.g., whether it is in a steady state mode or a transient mode. Steady state mode means that the clock recovery is in a locked mode and phase error is converged to zeros, while transient mode means that the clock recover is not in a locked mode and trying to acquire. In some cases, there can be some residual CD left on the Rx signal passing into the phase detectors 532. Due to filtering effects in electrical and/or optical channel of the coherent system, filters can have different gains for different frequencies, which may cause gain imbalance between the subcarriers. Particularly, outer SCs such as SC0 or SC(n−1) can be more affected by the channel filters, e.g., optical filters or low pass filtering of the local receiver components. Therefore, the complex numbers out of the phase detectors 532 associated with different subcarriers can have different angles (θ) and magnitudes.

Figure 8:
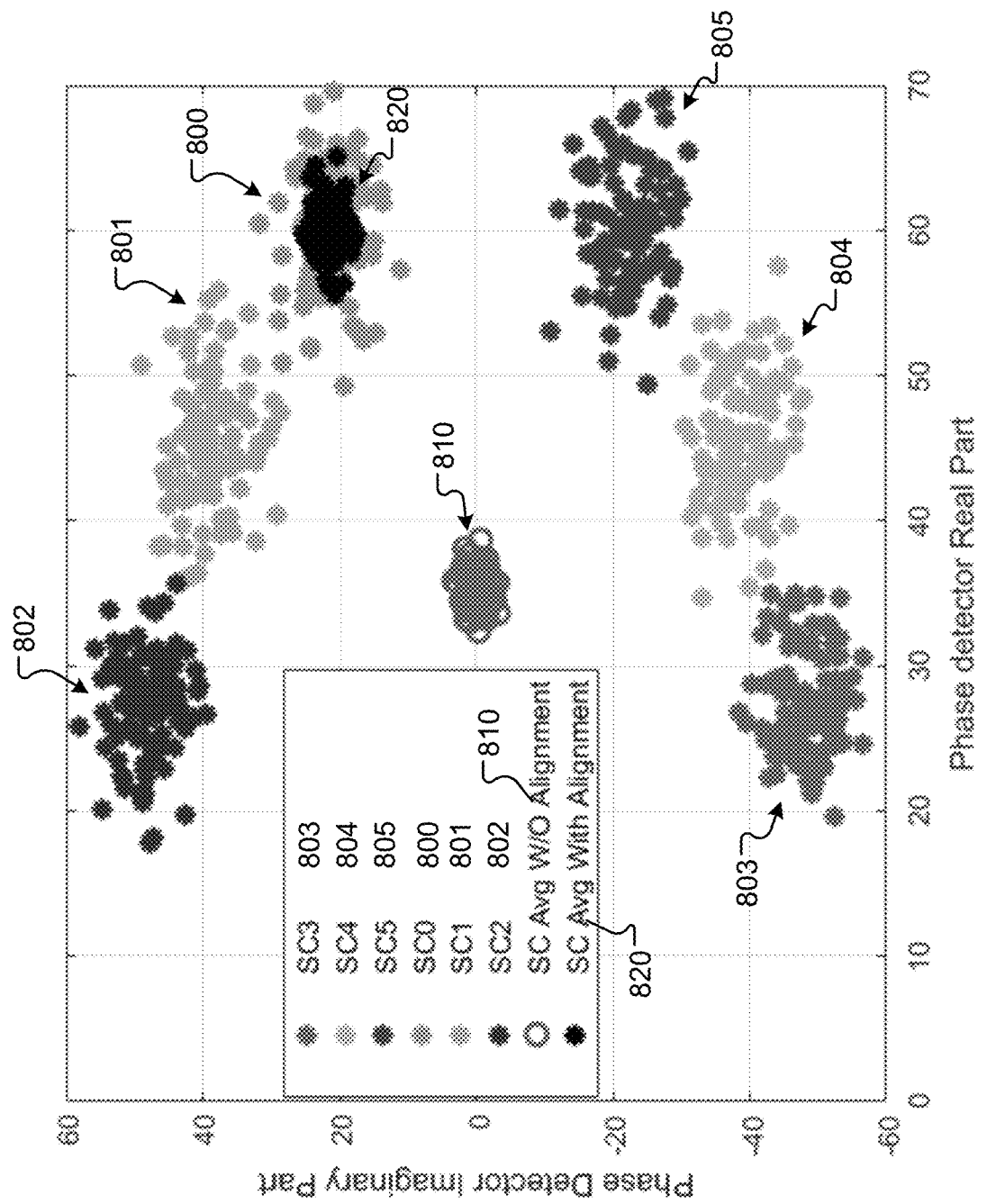
FIG. 8 illustrates outputs of phase detectors with and without alignment for a subcarrier based system.

For example, as illustrated in FIG. 8, in a system having 6 subcarriers (SCs) SC0 to SC5, there are residual CD and gain imbalance in the subcarriers SC0, . . . SC5, which cause the complex numbers out of phase detectors for the 6 subcarriers SC0, SC1, SC2, SC3, SC4, SC5 have different angles and magnitudes represented by dots 800, 801, 802, 803, 804, 805, respectively. In some cases, the outputs of the phase detectors 532 can be averaged out as one value. If the phase detection outputs are averaged without phase and gain alignment, the output of the phase detectors 532 can be significantly altered, e.g., generating higher error and detector jitter. Dots 810 show an averaged result of the 6 outputs of the phase detectors without phase and gain alignment, which shows that there is a large difference between the averaged result of the 6 outputs of the phase detectors and the individual outputs of the phase detectors 532. The averaged result is even worse than the output of one phase detector, e.g., as dots 800 shows. The imaginary part of the averaged result without alignment is almost zero, which means the sensitivity of the phase detectors is severely decreased. As discussed with further details below, adding an alignment block before adding the phase detection outputs together can improve the sensitivity of the phase detectors.

Referring back to FIG. 5B, the clock recovery unit 530-1 includes an alignment block 534 coupled between the phase detectors 532 and a subcarrier sum block 536. The alignment block 534 can be configured to align the outputs 533-0, . . . , 533-(n−1) (collectively referred to herein as "533") of the phase detectors 532, with gain alignment and/or phase alignment, such that the phase detection outputs 533 associated with different subcarriers SC0, . . . , SC(n−1) can have substantially same gain and substantially same phase before subcarrier averaging by the sum block 536.

Figure 6:
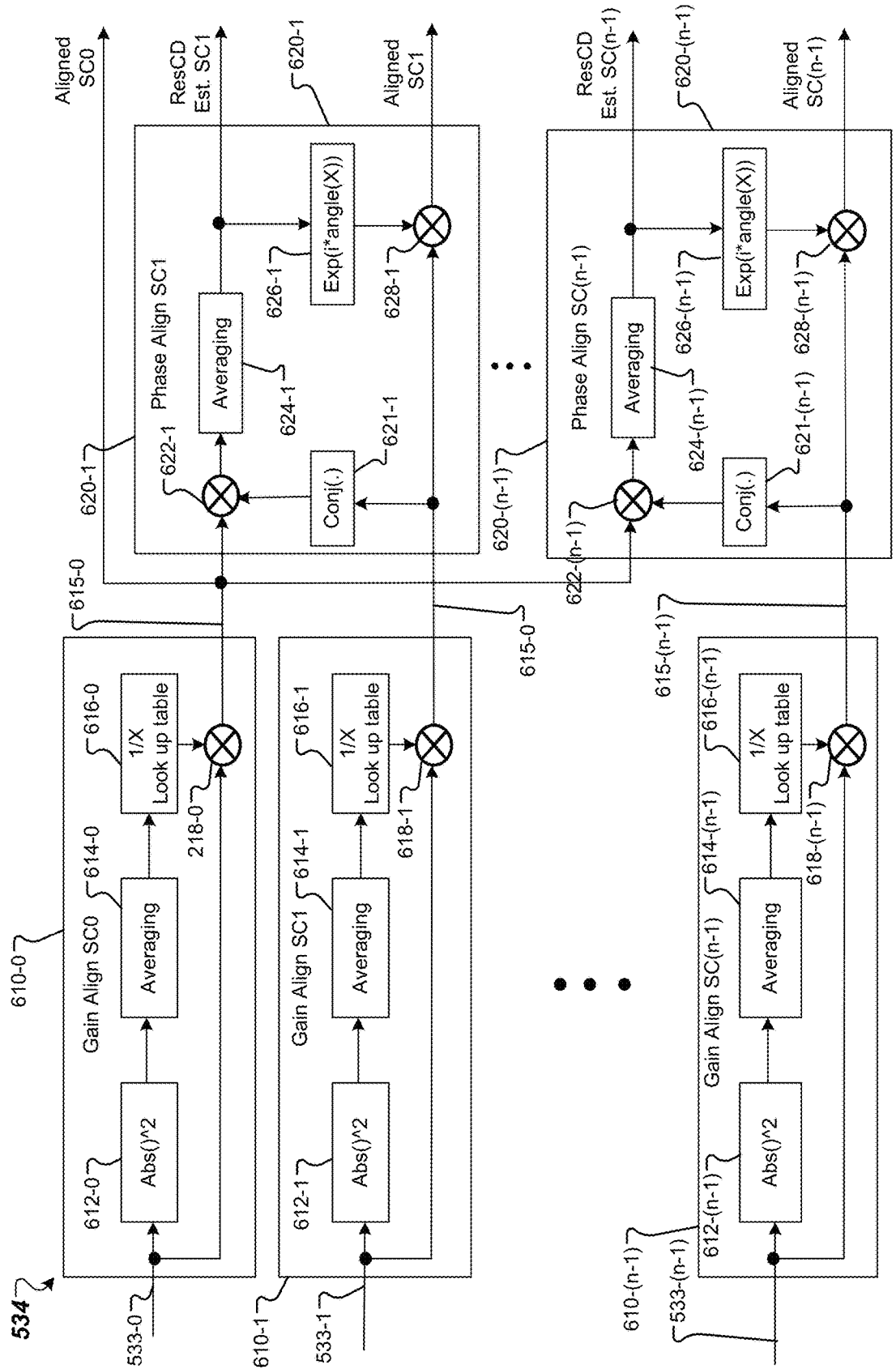
FIG. 6 is a schematic diagram illustrating an example of an alignment block for clock recovery.

FIG. 6 is a schematic diagram illustrating an example of an alignment block for clock recovery. The alignment block 534 receives the outputs 533 from the plurality of phase detectors 532. Each of the phase detection outputs 533 corresponds to a respective subcarrier SC0, SC1, . . . SC(n−1). Each of the phase detection outputs can be a complex number having a real part and an imaginary part.

The alignment block 534 can include a plurality of gain alignment sub-blocks 610-0, 610-1, . . . , 610-(n−1) (collectively referred to herein as "610"), that each are configured to align the gains of the outputs 533-0, 533-1, . . . , 533-(n−1) from the phase detectors 532-0, 532-1, . . . , 532-(n−1), respectively. In some implementations, each of the outputs 533 is normalized to have a unity gain. Each gain alignment sub-block 610 can include an absolute value module, an averaging module, a look up table, and a multiplier. For example, as illustrated in FIG. 6, the gain alignment sub-block 610-0 includes an absolute value module 612-0 for generating a gain based on the phase detection output associated with subcarrier SC0, an averaging module 614-0 for calculating an average gain of samples, a look up table 616-0 for obtaining an inversed value of the average gain, and a multiplier 618-0 for multiplying the inversed value with the phase detection output associated with subcarrier SC0. In such a way, the phase detection output 533-0 associated with subcarrier SC0 can be normalized to a gain-aligned output 615-0 have a unity gain with a phase associated with subcarrier SC0. Similarly, the other phase detection outputs 533-1, . . . , 533-(n−1) can be aligned with the respective gain alignment sub-blocks 610-1, 610-2, . . . , 610-(n−1) to obtain gain-aligned outputs 615-1, . . . , 615-(n−1) having a unity gain with respective phases for different subcarriers SC1, SC2, . . . , SC(n−1). Thus, after the gain alignment, the outputs 533 of the phase detectors 532 can have the substantially same gain.

The alignment block 534 includes a plurality of phase alignment sub-blocks 620-1, . . . , 620-(n−1) (collectively referred to herein as "620") to align the respective phases of the phase detection outputs 533 with a reference. In some implementations, the reference can be an external signal. In some implementations, one of the outputs associated with a particular subcarrier is selected as the reference. For example, as illustrated in FIG. 6, the output 533-0 associated with subcarrier SC0 is selected as the reference, and the other outputs are aligned with the output associated with subcarrier SC0 by the plurality of phase alignment sub-blocks 620-1, 620-2, . . . , 620-(n−1), respectively. In particular, a respective phase difference between each of the other outputs 533-1, . . . , 533-(n−1) associated with subcarriers SC1, . . . , SC(n−1) and the reference output 533-0 associated with subcarrier SC0, can be calculated and then each of the other outputs 533-1, . . . , 533-(n−1) can be compensated with the respective phase difference. In such a way, after the phase alignment sub-blocks 620, all the outputs 533 can be aligned, e.g., to have the substantially same phase as the reference. When there is no phase difference between the subcarriers, timing synchronization can be achieved for clock recovery.

As illustrated in FIG. 6, the phase alignment sub-block 620-1 includes a conjugation module 621-1, a first multiplier 622-1, an averaging module 624-1, a phase shifter 626-1, and a second multiplier 628-1. The other phase alignment sub-blocks 620-2, . . . , 620-(n−1) can have the same structure as the phase alignment sub-block 620-1. The conjugation module 621-1 is configured to obtain a complex conjugate of a complex number for the gain aligned output associated with subcarrier SC1. The first multiplier 622-1 is configured to multiply the complex conjugate of the complex number associated with subcarrier SC1 by the complex number for the gain aligned output associated with subcarrier SC0 to obtain a phase difference between the two outputs associated with subcarriers SC0 and SC1. The averaging module 624-1 is configured to obtain an averaged phase difference based on the phase differences from the first multiplier 622-1. Then the averaged phase difference is used to compensate the gain aligned output associated with subcarrier SC1 by the phase shifter 626-1 and the second multiplier 628-1. Thus, after the phase alignment, the output 533-1 associated with subcarrier SC1 has the substantially same phase as the reference output associated with subcarrier SC0. Similarly, the other outputs 533-2, . . . 533-(n−1) associated with subcarriers SC2, . . . , SC(n−1) can be phase aligned by respective phase alignment sub-blocks 620 to have the substantially same phase as the output associated with subcarrier SC0. Accordingly, after the alignment block 200, gains and phases of all the phase detection outputs are aligned.

As one of the phase detection outputs 533-0, 533-1, . . . , 533-(n−1) for SC0, SC1, . . . , SC(n−1) is selected as the reference for aligning the phases of the other outputs, the total number of phase alignment sub-blocks 620 is n−1, while the total number of gain alignment sub-blocks 610 for normalizing the gains of the phase detection outputs is n.

Also, a phase difference between two phase detection outputs, e.g., 533-0 and 533-1, associated with difference subcarriers, e.g., SC0 and SC1, corresponds to a phase difference between the different subcarriers that is proportional to residual CD. Thus, a value of the residual CD can be estimated from the phase difference between the phase detection outputs. As illustrated in FIG. 5B, the alignment block 534 can provide phase differences between the outputs 533-1, . . . , 533-(n−1) for subcarriers SC1, . . . SC(n−1) and the reference output 533-0 for subcarrier SC0 that can be used to estimate the residual CD values for the subcarriers SC1, . . . SC(n−1) with respect to subcarrier SC0. The estimated residual CD value for subcarrier SC0 can be 0. The estimated residual CD values can be fed back to the CDEQ circuits 526 in the FDEQ 520-1, to compensate CDs in de-multiplexed digital subcarriers.

The phase detection outputs 533-0, . . . , 533-(n−1) associated with different subcarriers SC0, . . . , SC(n−1) are aligned by the alignment block 534 to have substantially same gain, e.g., a unity gain, and substantially same phase, e.g., as the output 533-0 associated with one of the subcarriers SC0. Then the aligned outputs associated with subcarriers SC0, . . . , SC(n−1) are provided to a subcarrier sum block 536. The subcarrier sum block 536 can be configured to perform subcarrier averaging among the aligned outputs associated with subcarriers SC0, . . . , SC(n−1) to obtain a final phase detection output (or an overall phase detection output) 537 for the phase detectors 532. Thus, the sensitivity of the overall phase detectors can be greatly increased. The final phase detection output can be a complex number having a real part and an imaginary part. The real part of the complex number can be used for lock detector 539, and the imaginary part can be used for delay compensation by the digital phase interpolation module 514.

Figure 7:
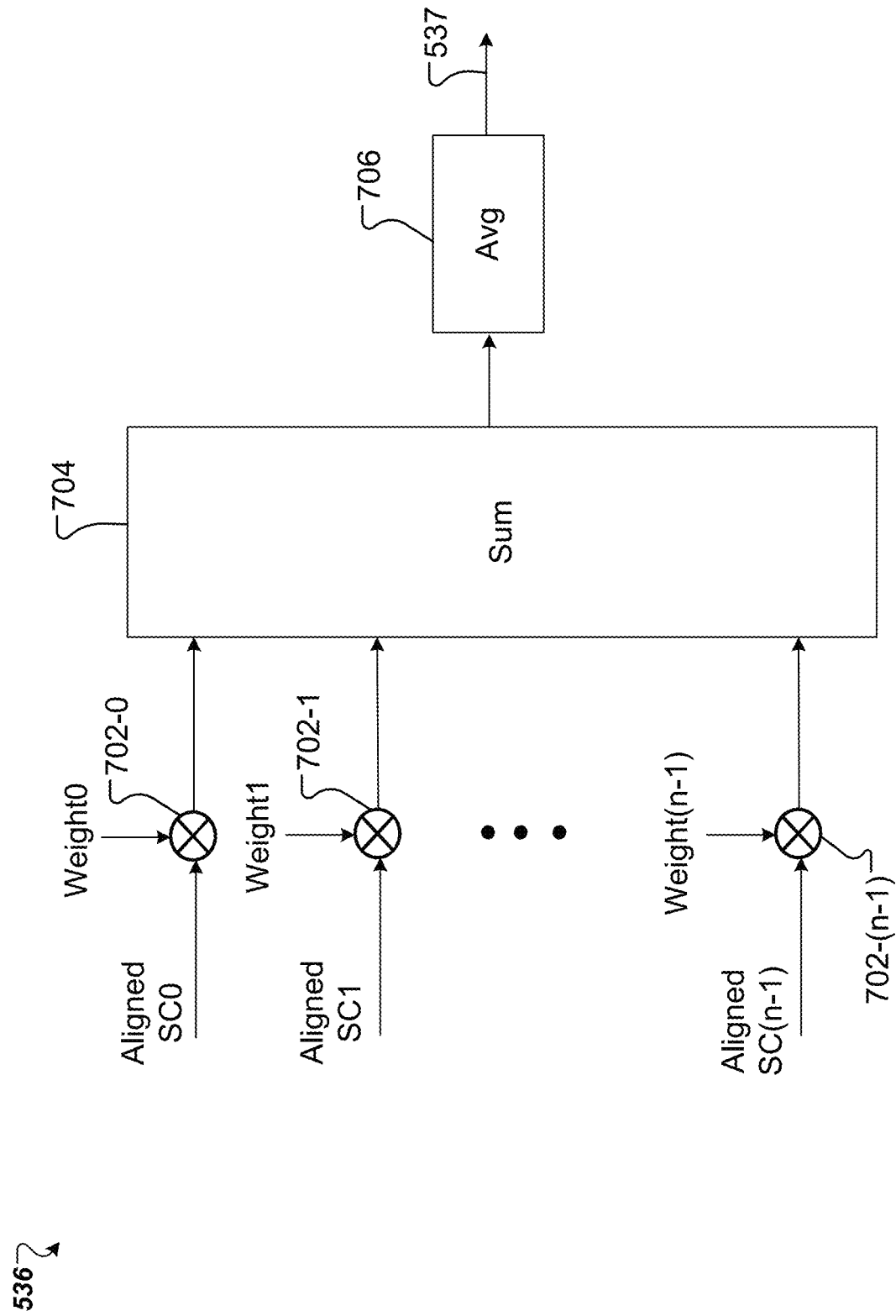
FIG. 7 is a schematic diagram illustrating an example of a subcarrier sum block.

FIG. 7 is a schematic diagram illustrating an example of a subcarrier sum block 536 in greater detail. The sum block 536 can be configured to receive a plurality of aligned phase detection outputs associated with subcarriers SC0, SC1, . . . , SC(n−1) from the alignment block 534, and perform subcarrier averaging on the plurality of aligned phase detection outputs to obtain a final phase detection output 537.

In some implementations, the sum block 536 includes a plurality of multipliers 702-0, 702-1, . . . , 702-(n−1) (collectively referred to herein as "702"), each for multiplying each of the plurality of aligned phase detection outputs with a respective weight weight0, weight1, . . . weight(n−1). The respective weights can be provided to the sum block 536 according to different applications. A weight can be used to select or unselect a particular aligned phase detection output associated with a particular subcarrier. For example, a receiver (Rx) signal is associated with n subcarriers SC0, SC1, . . . , SC(n−1). In some cases, only a first part of subcarriers is selected for clock recovery, e.g., by assigning the respective weights to be 1, and a second part of subcarriers is not selected for the clock recovery, e.g., by assigning the weights to be 0. In some cases, there exists failure of one or more subcarriers, and the phase detection outputs associated with the failed subcarriers can be unselected by assigning the weights to be 0, while the selected outputs associated with normal subcarriers are assigned to have a weight of 1.

The weighted aligned phase detection outputs can be summed up by a summing module 704 to get a summed output. The summed output can be divided by the number of the selected outputs using an averaging unit 706 to obtain a final phase detection output 537 for the aligned phase detection outputs associated with subcarriers SC0, SC1, . . . , SC(n−1). For example, if n is 8 and 6 outputs are selected for clock recovery, the summed output is divided by 6 to obtain the final phase detection output.

Referring to FIG. 8, the 6 outputs of the phase detectors are aligned, e.g., by the alignment block 534, with the output associated with subcarrier SC0 as the reference output. The aligned 6 outputs are then averaged, e.g., by using the sum block 536, to obtain a final phase detection output. Dots 820 shows the final phase detection output that has substantially same phase with the reference output associated with SC0 but with higher uniformity than the reference output (as shown by dots 800). Thus, delays between samples of the final phase detection output are substantially decreased, which can substantially reduce the jitter of the phase detectors. Dots 810, where the 6 outputs are averaged without any gain and phase alignment, show that the imaginary part of the averaged results is almost zero, which means the sensitivity of the phase detector is severely decreased. In comparison, dots 820, where the 6 outputs are averaged with gain and phase alignment, show the imaginary part of the averaged result is substantially same as the reference output associated with subcarrier SC0, which means that the sensitivity of the phase detector is not affected.

Referring back to FIG. 5B, the clock recovery unit 530-1 can include a loop filter, e.g., a first loop filter 538. The first loop filter 538 is configured to filter samples of the final phase detection output provided by the subcarrier sum block 536. As smaller time delays corresponds to broader frequency range and the time delays of the samples can be substantially decreased by using the alignment block 534 and the subcarrier sum block 536, the first loop filter 538 can have a larger frequency bandwidth than a clock recovery unit without alignment before subcarrier averaging. The filtered samples of the final phase detection output from the clock recovery unit 530-1 may next be provided back to the digital interpolator 510-1. In some implementations, the digital interpolator 510-1 includes a second loop filter 516 arranged between the clock recovery unit 530-1, e.g., the first loop filter 138, and the digital phase interpolation 514. The first loop filter 538 can be configured for steady state operation to filter out unwanted samples, and the second loop filter 516 can be configured for acquisition among the samples by the digital interpolation module 514. In some implementations, the first loop filter 538 and the second loop filter 516 can be both included in the clock recovery unit 530-1, the digital interpolator 510-1, or a separate device.

As noted above, the phase values input to the digital phase interpolation module 514 can be derived from the filter samples of the final phase detection output of the clock recovery unit 530-1. Thus, the digital phase interpolation module 514 can achieve more accurate phase interpolation for downstream processing, e.g., by the FDEQ 520-1, the TDEQ 508, and the carrier recovery unit 509. Accordingly, the digital interpolator 510-1, the FDEQ 520-1, and the clock recovery unit 530-1 constitute a feedback loop.

Figure 9:
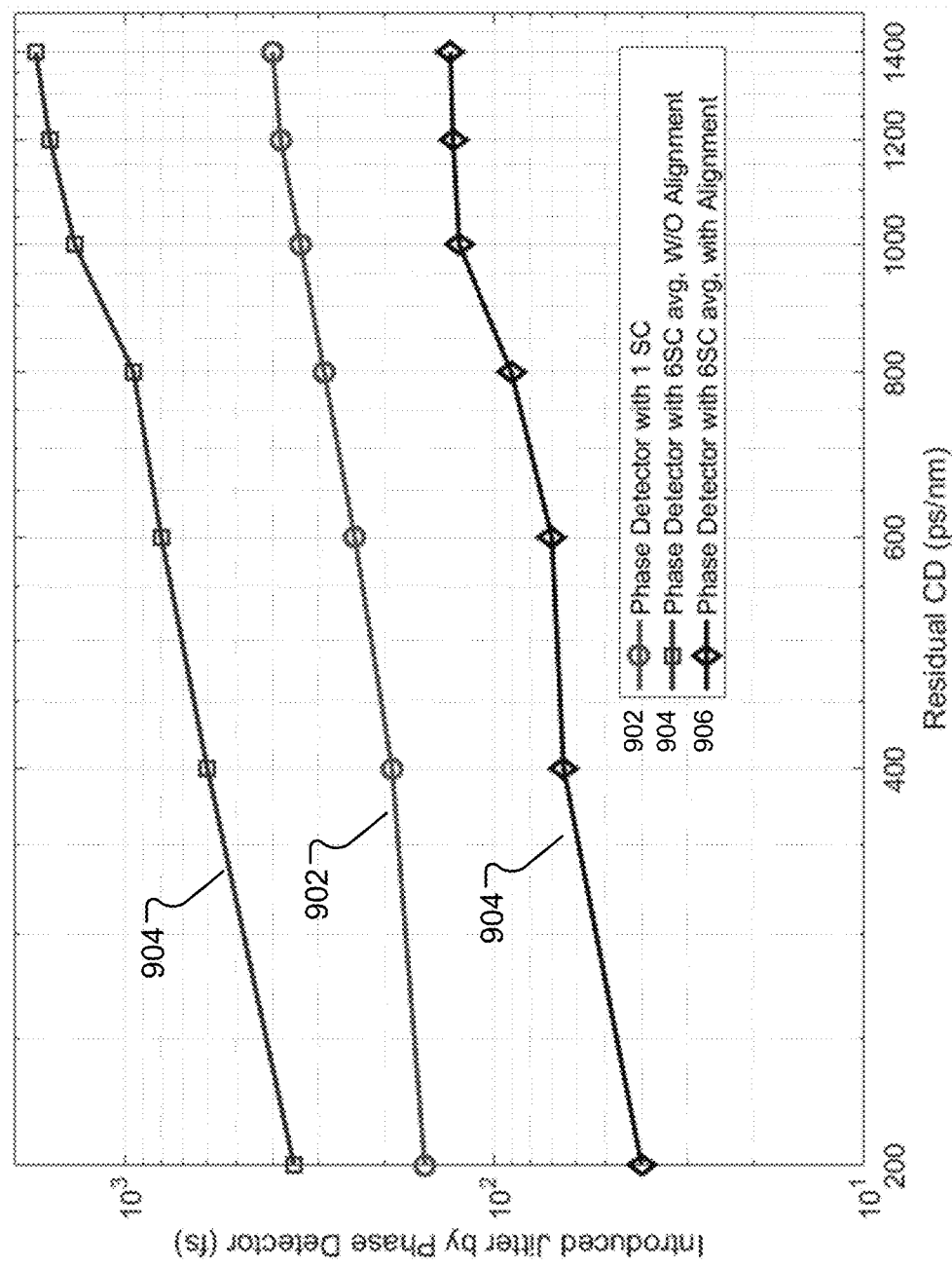
FIG. 9 illustrates introduced jitters for different values of residual chromatic dispersion (CD) by phase detectors with and without alignment.

FIG. 9 illustrates introduced jitters for different values of residual chromatic dispersion (CD) by phase detectors with and without alignment. In one example, a simulated transmitter (Tx) signal on each wave has a total baud rate of 66 Gbaud constructed using 8 subcarriers each at 8.25 Gbaud. The subcarriers are multiplexed at near Nyquist frequency spacing using an excessive bandwidth (BW) factor of 6%. Here, each of subcarriers SC0 to SC7 is modulated in accordance with a 64 QAM modulation format, which has 12 bits/s/Hz SE (spectral efficiency) for a dual polarization system. Three clock recovery methods are compared. The first one is the clock recovery based on an output of a phase detector on the most inner subcarrier. The second one is the clock recovery based on phase detectors on the 6 most inner subcarriers, but without alignment prior to a subcarrier sum block. The third one is the clock recovery according to the present disclosure that is based on phase detectors using the 6 most inner subcarriers with alignment prior to the sum block, e.g., by using the clock recovery unit 530-1. The additive detector jitters for different values of the residual CD are compared for the first, second, and third methods, as illustrated by plots 902, 904, 906, respectively. It is shown that the introduced jitter by using the clock recovery method with alignment is significantly lower than the other two methods. Plot 904 shows that the results using the second method is significantly worse than the others, as the sensitivity of the overall phase detector can be degraded significantly by adding outputs for sub carriers without alignment.

Figure 10:
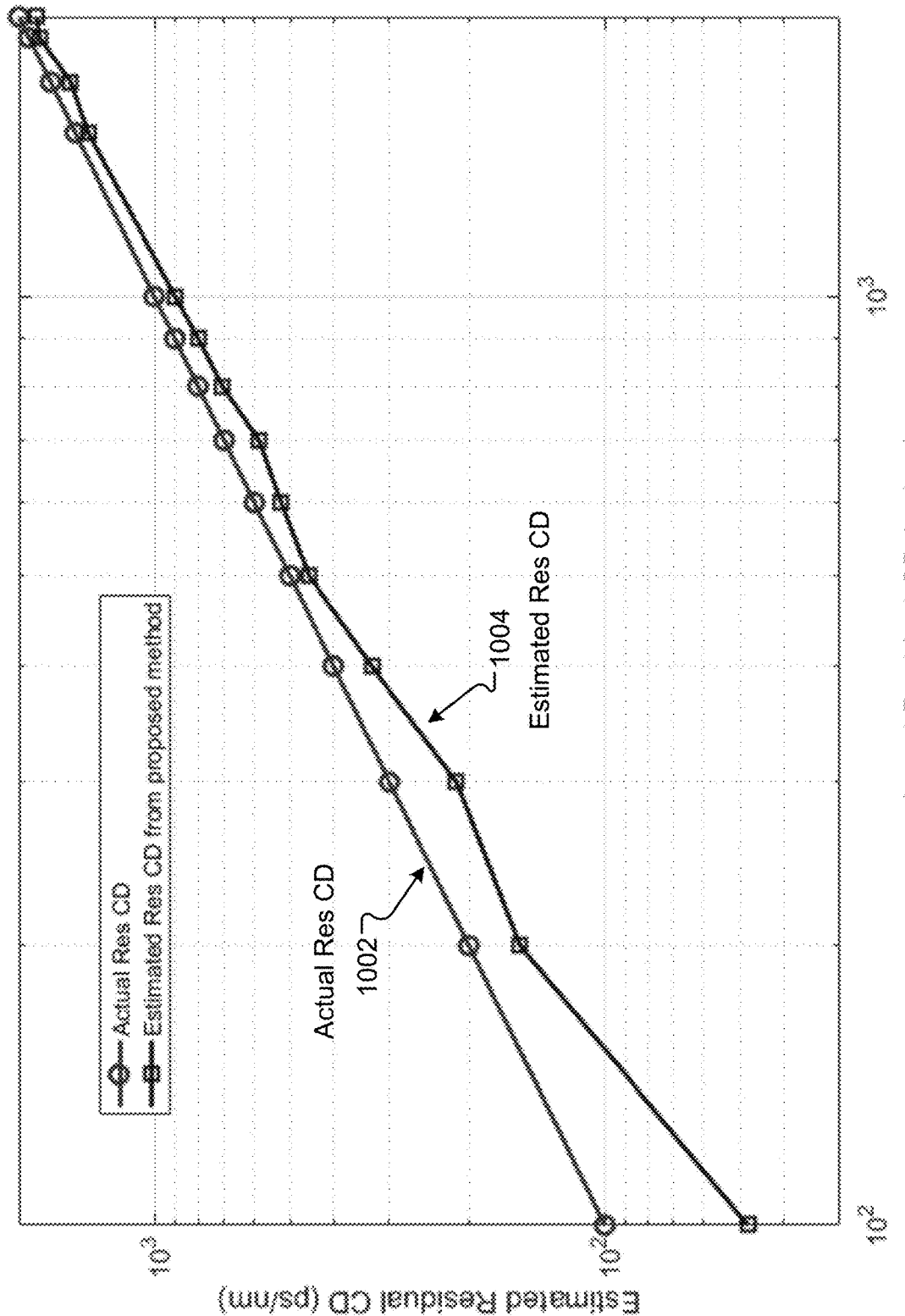
FIG. 10 illustrates a comparison between actual residual CD and estimated residual CD from phase detectors with alignment.

FIG. 10 illustrates a comparison between actual residual CDs 1002 and estimated residual CDs 1004 from phase detectors with alignment according to the present disclosure. It is shown that the estimated residual CDs with the third clock recovery method with alignment are very close to the actual residual CDs. Thus, the residual CD estimation in clock recovery, e.g., by the alignment block 534, and compensation in FDEQ, e.g., by CDEQ circuits 526, enables to improve the overall system performance, even in tougher channel conditions.

Figure 11:
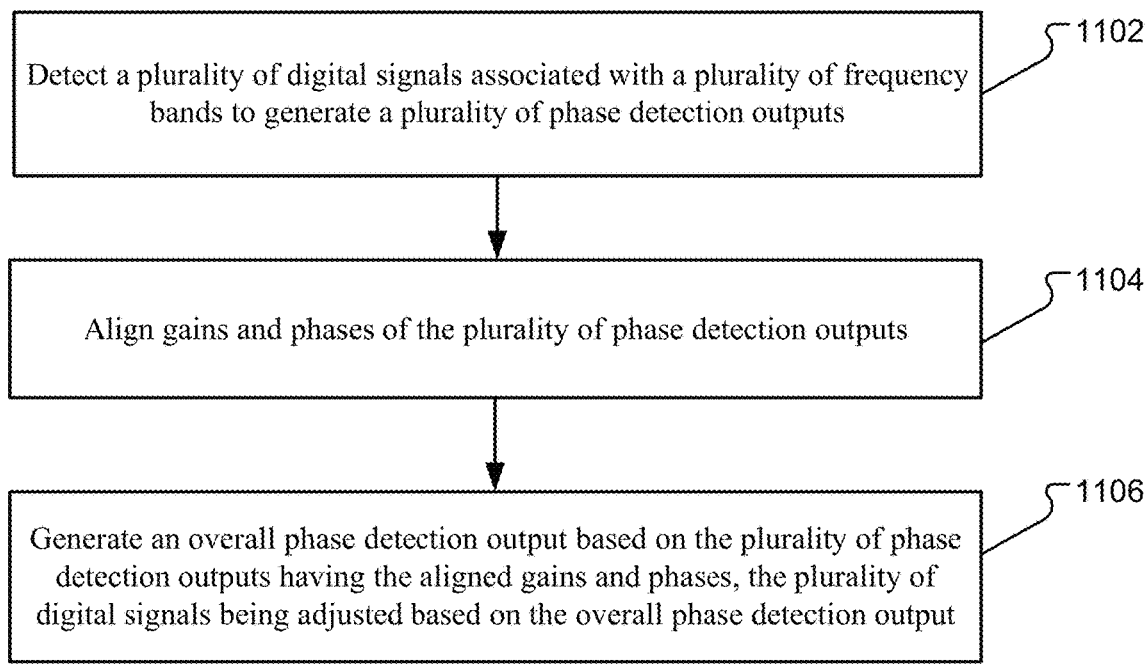
FIG. 11 is a flow diagram illustrating an example of a process for clock recovery with alignment.

FIG. 11 is a flow diagram illustrating an example of a process 1100 for clock recovery with alignment. The process 1100 can be performed by a processing device, e.g., Rx DSP 450. The processing device can include a clock recovery unit, e.g., the clock recovery unit 530-1. The clock recovery unit can include an alignment block, e.g., the alignment block 534. The processing device can also include a plurality of phase detectors, e.g., the phase detectors 532.

During step 1102, a plurality of digital signals is detected by the plurality of phase detectors to generate a plurality of phase detection outputs. The plurality of digital signals can be associated with a plurality of frequency bands. For example, each of the plurality of digital signals can correspond to a respective optical subcarrier associated with the respective frequency band.

During step 1104, gains and phases of the plurality of phase detection outputs are aligned, e.g., by the alignment block. In some implementations, the alignment block includes a plurality of gain alignment circuits coupled to the plurality of phase detectors, and each of the gain alignment circuits is configured to align a gain of a respective phase detection output, e.g., 533-0, . . . , 533-($n$−1). The aligned gains of the phase detection outputs, e.g., 615-0, . . . , 615-($n$−1), can be substantially same. In some cases, aligning the gains of the phase detection outputs includes normalizing each of the phase detection outputs to obtain a unity gain.

The alignment block can further include a plurality of phase alignment circuits coupled to the plurality of gain alignment circuits, and each of the plurality of phase alignment circuits is configured to align a phase of a respective phase detection output having the aligned gain, e.g., 615-0, . . . , 615-($n$−1). In some cases, aligning the phase of each of the phase detection outputs includes determining a phase difference between the phase detection output having the aligned gain and a reference and compensating the phase of the phase detection output based on the determined phase difference. The reference can be a particular phase detection output selected from the plurality of phase detection outputs. The phase difference can be proportional to a residual chromatic dispersion (CD) between digital signals, e.g., subcarriers, associated with the respective frequency bands.

In some implementations, the processing device includes chromatic dispersion equalizer (CDEQ) circuitry, e.g., CDEQ circuits 526, coupled to the plurality of phase detectors and configured to compensate chromatic dispersions for the plurality of digital signals. The phase differences obtained from the alignment block can be used to estimate the residual CDs. The CDED circuitry can adjust the CD compensations for the plurality of digital signals based on the estimated residual CDs.

During step 1106, an overall phase detection output is generated based on the plurality of phase detection outputs having the aligned gains and phases. In some implementations, the processing device includes averaging circuitry, e.g., the sum block 536. The averaging circuitry can include a plurality of multipliers, e.g., 702-0, 702-1, . . . , 702-($n$−1) configured to multiply the plurality of phase detection outputs by respective weights. In some cases, the averaging circuitry is configured to select particular phase detection outputs by multiplying the particular phase detection outputs by a particular weight larger than 0, e.g., 1, unselect the other phase detection outputs by multiplying them by 0, and average the selected particular phase detection outputs, e.g., by using the sum module 704 and the average module 706, to generate the overall phase detection output, e.g., the output 537.

The processing device is configured to adjust the plurality of digital signals based on the overall phase detection output such that a clock recovery loop can be formed. For example, the processing device can include a loop filter, e.g., the first loop filter 538 and/or the second loop filter 516. The loop filter can filter samples of the overall phase detection output, e.g., the output 537. The processing device can also include a digital interpolator, e.g., the digital interpolator 510-1, coupled to the averaging circuitry (e.g., the sum block 536) and configured to process a multiplexed signal with at least one phase value derived from the overall phase detection output. The multiplexed signal is associated with the plurality of frequency bands and the plurality of digital signals is generated based on the multiplexed signal. For example, the processing device can include a demultiplier, e.g., the demultiplier 524, to demultiplex the multiplexed signal into a plurality of demultiplexed signals in frequency domain, and each of the plurality of demultiplexed signals corresponds to a respective frequency band. The plurality of digital signals can be based on the plurality of demultiplexed signals.

Figure 12:
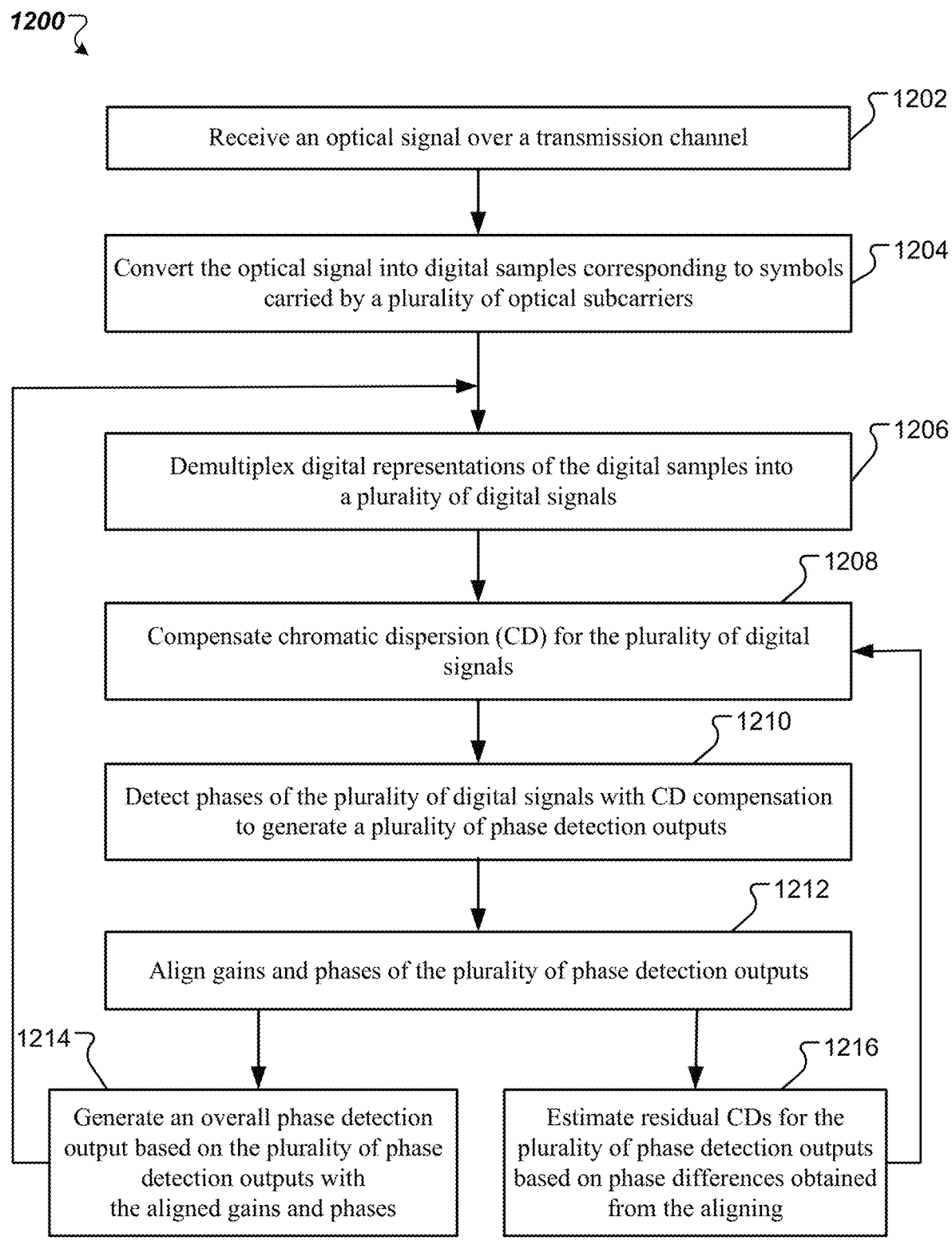
FIG. 12 is a flow diagram illustrating an example of a process for clock recovery in a subcarrier based coherent optical receiver.

FIG. 12 is a flow diagram illustrating an example of a process 1200 for clock recovery. The process 1200 can be performed by the receiver 130. The receiver can include a frontend, e.g., the frontend 402, and a processing device, e.g., Rx DSP 450.

During step 1202, an optical signal over a transmission channel is received, e.g., by the frontend 402 of the receiver 130. The optical signal can be transmitted from an optical transmitter, e.g., the transmitter 110, through the transmission channel, e.g., the channel 120. The optical signal can be a dual-polarized multiplexed optical signal associated with a plurality optical subcarriers, e.g., SC0, SC1, . . . , SC(n−1). Each of the plurality of optical subcarriers having a respective frequency band. In some cases, each of the optical subcarriers does not spectrally overlap with each other. Each of the plurality of optical subcarriers can be a Nyquist subcarrier. At least one of the plurality of optical subcarriers can be modulated in accordance with a modulation format. The modulation format can be one of an m-quadrature amplitude modulation (m-QAM) modulation, where m is a positive integer, a quadrature phase shift keying (QPSK) modulation format, and a binary phase shift keying (BPSK) modulation format.

During step 1204, the optical signal is converted, e.g., by the frontend 402, into digital samples corresponding to symbols carried by the plurality of optical subcarriers. The ADC circuitry, e.g., 440-1 and 440-2, can generate the digital samples from an electrical signal obtained by processing the optical signal.

During step 1206, digital representations of the digital samples are demultiplexed, e.g., by a demultipler 524 in the processing device 450, into a plurality of digital signals. Each of the plurality of digital signals is associated with a respective optical subcarrier of the plurality of optical subcarriers. The digital representations can be obtained by performing FFT on the digital samples, e.g., by an FFT module 522 in the processing device 450.

During step 1208, chromatic dispersion (CD) in the plurality of digital signals is compensated, e.g., by the processing device 450. The processing device can include a plurality of CDEQ circuits, e.g., the CDEQ circuits 526. Each CDEQ circuit 526 is configured to compensate CD for a respective digital signal.

During step 1210, phases of the plurality of digital signals with CD compensation are detected, e.g., by a plurality of phase detectors 532 in the processing device 450, to generate a plurality of phase detection outputs. Each phase detector can be coupled to a respective CDEQ circuit 526 and configured to receive a respective digital signal with CD compensation. The phase detectors can be the phase detectors 532. Each phase detection output, e.g., 533-0, ..., 533-($n$–1), can correspond to a respective optical subcarrier, SC0, ..., SC(n–1).

During step 1212, gains and phases of the plurality of phase detection outputs are aligned, e.g., by an alignment block in the processing device. The alignment block can be the alignment block 534. The alignment block 534 can be configured to align the phases of the plurality of phase detection outputs by first aligning gains of the plurality of phase detection outputs, e.g., by gain alignment modules 610-0, ..., 610-($n$–1), and then aligning the phases of the plurality of phase detection outputs having the aligned gains, e.g., by phase alignment modules 620-1, ..., 620-($n$–1). The aligned gains of the plurality of phase detection outputs can be substantially same. The aligned phases of the plurality of phase detection outputs can be substantially same.

In some cases, the gains of the plurality of phase detection outputs are aligned by normalizing each of the phase detection outputs to obtain a unity gain. In some cases, the phases of the plurality of phase detection outputs are aligned by determining a respective phase difference between each of the plurality of phase detection outputs and a particular phase detection output and compensate the phases of the plurality of phase detection outputs with the determined respective phase differences.

During step 1214, an overall phase detection output, e.g., the output 537, is generated, e.g., by a subcarrier sum block 536 in the processing device 450, based on the plurality of phase detection outputs with the aligned phases and the aligned gains. The subcarrier sum block can be the sum block 536. The subcarrier sum block can be configured to select particular phase detection outputs from the plurality of phase detection outputs with the aligned phases and gains and average the selected particular phase detection outputs to generate the overall phase detection output.

In some implementations, the processing device includes a digital interpolator, e.g., the digital interpolator 510-1, configured to interpolate phases of the digital samples from the ADC circuitry, e.g., ADCs 440-1. The digital interpolator 510-1 may perform the interpolation using at least one phase value. The at least one phase value can be derived and/or updated from the overall phase detection output 537. In some cases, the processing device can filter samples of the overall phase detection output 537, e.g., by the first loop filter 538 and/or the second loop filter 516, and derive the at least one phase value based on the filtered samples. The overall phase detection output can be provided to the digital interpolator 510-1 arranged upstream of the demultiplier 524. The process 1200 can proceed from step 1214 back before step 1206, such that the digital interpolator 510-1 can adjust the interpolation of digital representations of the digital samples based on the at least one phase value derived from the overall phase detection output 537.

During 1216, residual CDs for the plurality of phase detection outputs 533 are estimated based on the phase differences obtained from the alignment step 1212. The estimated residual CDs can be fed back to the CDEQ circuits 526, and the process 1200 can proceed from step 1216 to step 1208. Then the CD compensations of the plurality of digital signals can be adjusted based on the estimated residual CDs. In such a way, the residual CDs in the digital signals can be significantly reduced.

Embodiments of the disclosure and all of the functional operations described in this specification may be implemented in digital electronic circuitry, or in computer software, firmware, or hardware, including the structures disclosed in this specification and their structural equivalents, or in combinations of one or more of them. Embodiments of the disclosure may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the disclosure may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the disclosure may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the disclosure, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus comprising:
    a plurality of phase detectors configured to generate a plurality of phase detection outputs by detecting a plurality of digital signals associated with a plurality of frequency bands, each of the plurality of phase detection outputs being associated with a respective one of the plurality of frequency bands;
    alignment circuitry coupled to the plurality of phase detectors and configured to align phases of the plurality of phase detection outputs to be substantially same; and
    averaging circuitry coupled to the alignment circuitry and configured to generate a particular output based on the plurality of phase detection outputs with the aligned phases,
    wherein the plurality of digital signals is adjusted based on the particular output, and
    each of the plurality of digital signals corresponds to a respective optical subcarrier associated with the respective frequency band.

2. The apparatus of claim 1, wherein each of the respective optical subcarriers does not spectrally overlap with each other.

3. The apparatus of claim 1, wherein at least one of the plurality of optical subcarriers is modulated in accordance with a modulation format, the modulation format being one of an m-quadrature amplitude modulation (m-QAM) modulation, where m is a positive integer, a quadrature phase shift keying (QPSK) modulation format, and a binary phase shift keying (BPSK) modulation format.

4. An apparatus, comprising:
    a plurality of phase detectors configured to generate a plurality of phase detection outputs by detecting a plurality of digital signals associated with a plurality of frequency bands, each of the plurality of phase detection outputs being associated with a respective one of the plurality of frequency bands;
    alignment circuitry coupled to the plurality of phase detectors and configured to align phases of the plurality of phase detection outputs to be substantially same; and averaging circuitry coupled to the alignment circuitry and configured to generate a particular output based on the plurality of phase detection outputs with the aligned phases, wherein the plurality of digital signals is adjusted based on the particular output;

a plurality of gain alignment circuits coupled to the plurality of phase detectors, each of the gain alignment circuits being configured to align a gain of a respective one of the plurality of phase detection outputs; and a plurality of phase alignment circuits coupled to the plurality of gain alignment circuits, each of the plurality of phase alignment circuits being configured to align a phase of a respective one of the plurality of phase detection outputs that has an aligned gain.

5. The apparatus of claim 4, wherein the aligned gains of the plurality of phase detection outputs are substantially same.

6. The apparatus of claim 4, wherein each of the gain alignment circuits is configured to normalize the gain of the respective one of the plurality of phase detection outputs.

7. The apparatus of claim 4, wherein each of the plurality of phase alignment circuits is configured to:
determine a phase difference between the respective one having the aligned gain and a reference; and
compensate the phase of the respective one based on the determined phase difference.

8. The apparatus of claim 7, wherein the reference is a particular phase detection output having a particular aligned gain of the plurality of phase detection outputs having aligned gains.

9. The apparatus of claim 8, wherein the phase difference between the respective one and the particular phase detection output is associated with a residual chromatic dispersion (CD) between digital signals corresponding to the respective one and the particular phase detection output.

10. The apparatus of claim 9, further comprising:
chromatic dispersion equalizer (CDED) circuitry coupled to the plurality of phase detectors and configured to generate the plurality of digital signals with CD compensations,
wherein the CDED circuitry is configured to adjust the CD compensations for the plurality of digital signals based on estimated values of the residual CDs that are obtained based on the phase differences.

11. The apparatus of claim 4, wherein a number of the plurality of phase alignment circuits is smaller than a number of the plurality of gain alignment circuits by 1.

12. An apparatus, comprising:
a plurality of phase detectors configured to generate a plurality of phase detection outputs by detecting a plurality of digital signals associated with a plurality of frequency bands, each of the plurality of phase detection outputs being associated with a respective one of the plurality of frequency bands;
alignment circuitry coupled to the plurality of phase detectors and configured to align phases of the plurality of phase detection outputs to be substantially same; and
averaging circuitry coupled to the alignment circuitry and configured to generate a particular output based on the plurality of phase detection outputs with the aligned phases,
wherein the plurality of digital signals is adjusted based on the particular output, and wherein the averaging circuitry comprises a plurality of multipliers configured to multiply the plurality of phase detection outputs by respective weights.

13. The apparatus of claim 12, wherein the averaging circuitry is configured to:
select particular phase detection outputs of the plurality of phase detection outputs by multiplying the particular phase detection outputs by a particular weight larger than 0;
unselect the other of the plurality of phase detection outputs by multiplying the other of the plurality of phase detection outputs by 0; and
average the selected particular phase detection outputs to generate the particular output.

14. An apparatus, comprising:
a plurality of phase detectors configured to generate a plurality of phase detection outputs by detecting a plurality of digital signals associated with a plurality of frequency bands, each of the plurality of phase detection outputs being associated with a respective one of the plurality of frequency bands;
alignment circuitry coupled to the plurality of phase detectors and configured to align phases of the plurality of phase detection outputs to be substantially same; and
averaging circuitry coupled to the alignment circuitry and configured to generate a particular output based on the plurality of phase detection outputs with the aligned phases,
wherein the plurality of digital signals is adjusted based on the particular output; and
a loop filter coupled to the averaging circuitry and configured to filter samples of the particular output.

15. An apparatus, comprising:
a plurality of phase detectors configured to generate a plurality of phase detection outputs by detecting a plurality of digital signals associated with a plurality of frequency bands, each of the plurality of phase detection outputs being associated with a respective one of the plurality of frequency bands;
alignment circuitry coupled to the plurality of phase detectors and configured to align phases of the plurality of phase detection outputs to be substantially same; and
averaging circuitry coupled to the alignment circuitry and configured to generate a particular output based on the plurality of phase detection outputs with the aligned phases,
wherein the plurality of digital signals is adjusted based on the particular output; and
a digital interpolator coupled to the averaging circuitry and configured to process a multiplexed signal with at least one phase value derived from the particular output,
wherein the multiplexed signal is associated with the plurality of frequency bands and the plurality of digital signals is generated based on the multiplexed signal.

16. The apparatus of claim 15, further comprising a demultiplier configured to demultiplex the multiplexed signal into a plurality of demultiplexed signals in frequency domain, each of the plurality of demultiplexed signals corresponding to a respective one of the plurality of frequency bands,
wherein the plurality of digital signals is based on the plurality of demultiplexed signals.

17. A receiver comprising:
a frontend configured to receive an optical signal and convert the optical signal into digital samples corresponding to symbols carried by a plurality of optical subcarriers, each of the plurality of optical subcarriers having a respective frequency band; and a processing device coupled to the frontend and configured to:

demultiplex digital representations of the digital samples into a plurality of digital signals, each of the plurality of digital signals being associated with a respective optical subcarrier of the plurality of optical subcarriers;

detect phases of the plurality of digital signals to generate a plurality of phase detection outputs, each of the plurality of phase detection outputs being associated with a respective optical subcarrier of the plurality of optical subcarriers;

align the phases of the plurality of phase detection outputs;

generate a particular output based on the plurality of phase detection outputs with the aligned phases; and adjust the plurality of digital signals based on the particular output.

18. The receiver of claim 17, wherein the processing device is configured to:

align gains of the plurality of phase detection outputs such that the aligned gains of the plurality of phase detection outputs are substantially same; and align the phases of the plurality of phase detection outputs having the aligned gains such that the aligned phases of the plurality of phase detection outputs are substantially same.

19. The receiver of claim 18, wherein the processing device is configured to:

determine a respective phase difference between each of the plurality of phase detection outputs and a particular phase detection output of the plurality of phase detection outputs; and compensate the phases of the plurality of phase detection outputs with the determined respective phase differences.

20. The receiver of claim 19, wherein the processing device is configured to:

estimate residual chromatic dispersion values for the plurality of digital signals based on the determined respective phase differences; and adjust chromatic dispersion compensations of the plurality of digital signal based on the estimated residual chromatic dispersion values.

21. The receiver of claim 17, wherein the processing device is configured to:

select particular phase detection outputs from the plurality of phase detection outputs having the aligned phases; and average the selected particular phase detection outputs to generate the particular output.

22. The receiver of claim 17, wherein the processing device is configured to:

adjust interpolation of digital representations of the digital samples based on at least one phase value derived from the particular output.

23. The receiver of claim 22, wherein the processing device is configured to:

filter samples of the particular output; and derive the at least one phase value based on the filtered samples.

24. The receiver of claim 17, wherein the processing device comprises a digital signal processor (DSP).

25. A method comprising:

detecting a plurality of digital signals associated with a plurality of frequency bands to generate a plurality of phase detection outputs, each of the plurality of phase detection outputs being associated with a respective one of the plurality of frequency bands;

aligning phases of the plurality of phase detection outputs to be substantially same; and generating a particular output based on the plurality of phase detection outputs having the aligned phases, wherein the plurality of digital signals is adjusted based on the particular output, wherein each of the plurality of digital signals corresponds to a respective optical subcarrier associated with a respective one of the plurality of frequency bands.

* * * * *